US011870287B2

(12) United States Patent
Roberts et al.

(10) Patent No.: US 11,870,287 B2
(45) Date of Patent: *Jan. 9, 2024

(54) STORAGE AND CHARGING STATION SYSTEM FOR MOBILE ELECTRONIC DEVICES HAVING A UNITARY SUPPORT TOWER CAGE STRUCTURE

(71) Applicant: Nathan R. Roberts, Columbus, WI (US)

(72) Inventors: Nathan R. Roberts, Columbus, WI (US); Beau M. Wishner, Columbus, WI (US)

(73) Assignee: Nathan R. Roberts, Columbus, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,710

(22) Filed: Nov. 30, 2021

(65) Prior Publication Data

US 2022/0094186 A1 Mar. 24, 2022

Related U.S. Application Data

(63) Continuation-in-part of application No. 16/986,604, filed on Aug. 6, 2020, now Pat. No. 11,462,925.

(51) Int. Cl.
*H02J 7/00* (2006.01)

(52) U.S. Cl.
CPC .......... *H02J 7/0045* (2013.01); *H02J 7/0013* (2013.01); *H02J 7/00032* (2020.01); *H02J 7/0047* (2013.01)

(58) Field of Classification Search
CPC .................................................... H02J 7/0045
USPC ............................................... 320/115
See application file for complete search history.

(56) References Cited

U.S. PATENT DOCUMENTS

| | | | |
|---|---|---|---|
| 9,323,288 B2 | 4/2016 | Dresser, III | |
| 9,501,380 B2 | 11/2016 | Johnson et al. | |
| 9,680,317 B2 | 6/2017 | Roberts | |
| 9,817,749 B2 | 11/2017 | D'Abreu et al. | |
| 10,076,050 B2 | 9/2018 | Roberts | |
| 10,084,327 B2 | 9/2018 | Roberts | |
| 10,312,700 B2 | 6/2019 | Roberts | |
| 10,412,853 B2 | 9/2019 | Dombrowski et al. | |
| 10,638,630 B2 | 4/2020 | Roberts | |
| 2015/0220416 A1 | 8/2015 | Johnson et al. | |
| 2015/0380964 A1* | 12/2015 | Tischer | H02J 7/0013 320/137 |
| 2016/0056645 A1* | 2/2016 | Henman | G01V 1/247 320/112 |
| 2016/0268822 A1* | 9/2016 | Toya | H02J 7/0068 |
| 2016/0276852 A1* | 9/2016 | Roberts | H05K 7/14 |

(Continued)

*Primary Examiner* — Yalkew Fantu
(74) *Attorney, Agent, or Firm* — Boardman & Clark LLP

(57) ABSTRACT

A storage and charging station system for mobile electronic devices is described. The storage and charging station system includes a support tower structure including shelves for storing the mobile electronic devices during charging, a support device coupled to the support tower structure, a grid system on one side of the support tower structure, the grid system for mounting various accessories, a wire management system positioned adjacent to each of the shelves, a cable management system coupled to one side of the support tower structure, and a power distribution unit coupled to the support tower structure.

22 Claims, 27 Drawing Sheets

(56) References Cited

U.S. PATENT DOCUMENTS

| | | |
|---|---|---|
| 2017/0039122 A1 | 2/2017 | Johnson et al. |
| 2017/0047751 A1 | 2/2017 | Fernandes |
| 2018/0351375 A1 | 12/2018 | Baldasare et al. |
| 2019/0027944 A1 | 1/2019 | Grzybowski et al. |

\* cited by examiner

SECTION A-A

SECTION B-B

SECTION C-C

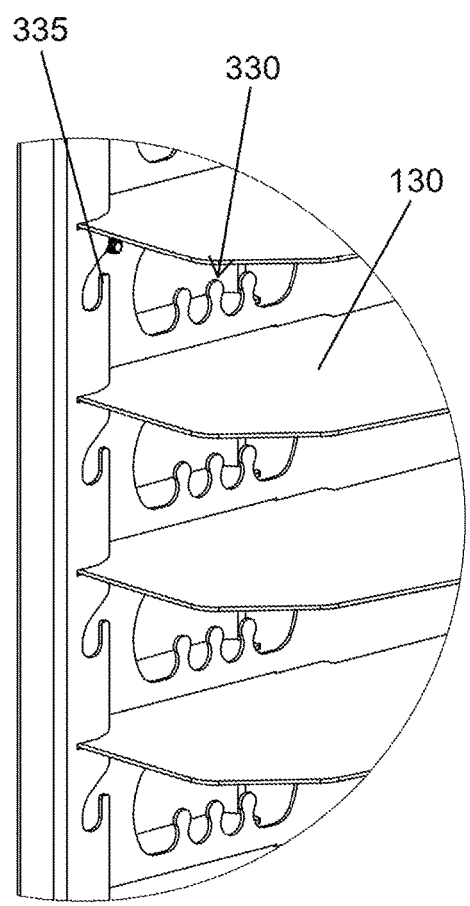
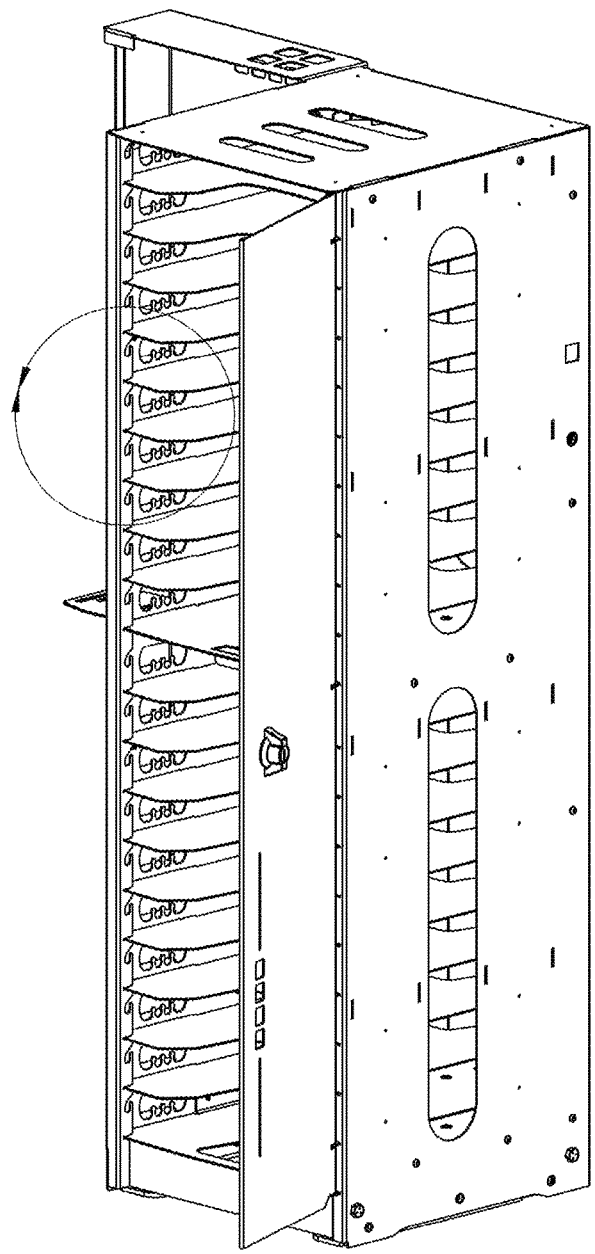
FIG. 26

STORAGE AND CHARGING STATION SYSTEM FOR MOBILE ELECTRONIC DEVICES HAVING A UNITARY SUPPORT TOWER CAGE STRUCTURE

CROSS-REFERENCE TO RELATED APPLICATIONS

This application is a continuation in part of U.S. patent application Ser. No. 16/986,604 filed Aug. 6, 2020, entitled "STORAGE AND CHARGING STATION SYSTEM FOR MOBILE ELECTRONIC DEVICES HAVING A UNITARY SUPPORT TOWER CAGE STRUCTURE", the entire contents of which is hereby incorporated by reference herein in its entirety.

FIELD OF THE INVENTION

The present invention relates to storage and charging stations for electronic devices. More specifically, the present invention relates to a system for centralized storage, charging, deployment, inventorying and management of mobile electronic devices.

BACKGROUND

Mobile electronic devices are generally known in the art. Mobile electronic devices, such as tablet and laptop computers, have become common place in personal and professional endeavors, including educational and business setting. Desktop computers initially paved the way for common personal and business use of computers for word processing, data entry, planning, general and technical information-transfer, business management, remote communication, self-education and other uses. Improving mobile electronic devices, including cell phones, rapidly increased individual electronics use within organizations, including educational and business organizations, which now may centrally purchase quantities of generally uniform selected mobile electronic devices for use by students, employees, or other users served by such organizations.

These purchasing organizations may desire a certain amount of control of the mobile electronic devices. The amount of control to assert may be dependent upon a number of factors considered by organizations, including, but not limited to, management of the mobile electronic devices, inventory of the mobile electronic devices, the type of user of mobile electronic devices, the number of potential users for each mobile electronic device, the environment in which the mobile electronic device is in use, the relationship between the user and purchasing organization, the number of mobile electronic devices in use, updating and maintenance of the mobile electronic devices, and/or minimizing risk of loss and/or replacement costs of the mobile electronic devices. Which factor(s) have the greatest weight in dictating the necessary amount of control is dependent upon the specific purchasing organization.

For example, in a school setting, a mobile electronic device may be assigned to a specific student. That student may pick up the mobile electronic device at a certain time during the school day, such as at the beginning of the school day, use it throughout the school day, and return the mobile electronic device at the end of the school day. In another example, in a school setting, a classroom of students may use a number of mobile electronic devices for a period of time during the day. As the students turn over in the classroom, such as by changing classes during the day, different students may use the number of mobile electronic devices. As such, a plurality of different students may use a single mobile electronic device during a day. In these examples, while utilizing the mobile electronic devices as an educational tool is an outstanding way for students to learn, it can lead to issues in maintaining the mobile electronic devices. For example, it may be difficult to inventory the devices during the day, charge or recharge the devices, account for the return of all devices once students complete use of the devices, and/or efficiently deploy new software or associated updates.

Similar to a school setting, mobile electronic devices may be deployed for public use at libraries or other public access building. In this setting, the mobile electronic devices may be checked out to users for a period of time. Again, many of the same problems as would arise in an educational setting, such as the ability to inventory or account for the return of all devices, may arise at these public settings.

As another example, businesses or hospitals/medical service providers may deploy mobile electronic devices in association with business operations or providing medical services, respectively. For efficiency or operational gains to be realized by use of the mobile electronic devices, the mobile electronic devices must be operational and must be used. The inability of the business or medical service provider to control the mobile electronic devices can interrupt any efficiency or operational gains. For example, should an employee take a mobile electronic device from the premises and forget to return it, that employee will not be able to use the mobile electronic device during performance of his or her job. Similarly, if an employee fails to charge or fully recharge the battery of the mobile electronic device, the mobile electronic device can run out of power during an employee's workday, rendering the mobile electronic device useless. This and other situations not referenced can lead to inefficiencies and unnecessary risks of loss.

Accordingly, purchasing organizations have utilized storage and charging stations which can be conveniently located within the organization's various business and educational facilities for organizing, storing, charging, accessing and returning the organization's mobile electronic devices to an assigned station for recharging and future user access and independent use. Examples of such storage and charging stations in current use are disclosed and described in U.S. Pat. No. 10,312,700.

SUMMARY

The present invention provides one or more examples of embodiments of a storage and charging station system for mobile electronic devices incorporating a unitary support tower cage structure for securely retaining a plurality of mobile electronic devices in a vertically spaced array within a reachable height for its intended user group. The unitary support tower cage structure provides a vertical profile to allow for the storage and charging of a plurality of mobile electronic devices supported by vertically spaced generally horizontal support shelves mounted and supported within the unitary tower cage structure to define a storage bay above each support shelf while minimizing the amount of space and material consumed by the system. In addition, the unitary support tower cage structure provides for easy verification of inventory, as each of the spaced horizontal shelves is visible through a plurality of spaced multi-functional openings in the support cage walls which allow each storage bay and any mobile electronic device stored therein or the lack thereof to be visually verified from a distance outside the cage structure. The multi-functional openings in the support cage walls are further functional to provide ventilation and cooling during periods of charging all of the contained mobile electronic devices simultaneously, and to facilitate the transmission of electronic information and data to and from mobile electronic devices positioned within the tower cage structure, for the convenience of both system managers and users of the mobile devices. The system implements a cable management system to provide for centralized charging and/or data distribution to the plurality of devices while reducing the visibility and entanglement of associated cables. In addition, the system selectively distributes power to the plurality of electronic devices to facilitate charging and recharging of the mobile electronic devices. The system further may incorporate one or more locking assemblies to lock the plurality of electronic devices and electronic powering devices and associated electronic cables within the assembly and reduce the risk of device theft. The storage and charging station system of the invention advantageously provides for a central location for the storage, inventory, charging, identification and access to mobile electronic devices, thereby assisting in the deployment, inventory, management, and theft reduction of multiple mobile electronic devices and related components.

A storage and charging station for mobile electronic devices is provided. The station includes a unitary support tower cage structure including at least a first vertically extending side panel, a second vertically extending rear panel integrally connected to the first side panel and extending therefrom at an angle thereto, and a third vertically extending side panel integrally connected to the rear panel and extending therefrom at a substantial right angle thereto in generally opposed relation to the first side panel. The three vertically extending panels are further fixedly connected to each other near their lower edges by a flanged lower support shelf which spans the lower end of the space defined by the three unitary vertically extending panels, near their upper edges by a flanged cover panel, and typically near cage midpoint by a flanged middle support shelf. Multiple additional support shelves are provided in efficiently spaced relation between the lower flanged support shelf and the flanged cover, typically generally horizontally supported by support edges of channel members affixed to the inside surface of the tower cage structure and/or of support edges formed in the tower cage structure itself. In addition, each support shelf may have a protruding side support shelf portion which protrudes outwardly of the tower cage structure through a supporting shelf alignment slot in a cage side panel to provide a support surface with cable management slots for electronic USB cable or a power "brick" transformer and connecting cable to be provided for charging an electronic device supported on the associated interior shelf surface within the unitary cage structure. Additionally, a cable management aperture may be provided in the cage side panel above each shelf alignment slot to facilitate extension of the cable from above the side support shelf portions through the tower cage side panel for easy connection by the user to a mobile electronic device supported on the interior shelf surface.

The base of the unitary support tower cage structure may be fitted at the rear and front portions of the vertical side panels with suitable support pads. Security for the electronic components and mobile electronic devices supported by the tower assembly may be provided by a main door and a side cover, both pivotable between open and closed positions, and having lockable latches, while still providing visual access to the contents of the tower assembly. Taller unitary support tower cage structures of the described invention may be connected through the rear vertical panel and rear channel shelf supports thereof to free standing or mobile support frame systems as shown and described in previously identified U.S. Pat. No. 10,084,327, with reference to FIG. 50-57 thereof. These and other features and advantages of devices, systems, and methods described herein, will be apparent from the following detailed descriptions and drawings of various examples of embodiments of the invention.

A storage and charging station system for mobile electronic devices is described. The storage and charging station system includes a support tower structure including shelves for storing the mobile electronic devices during charging, a support device coupled to the support tower structure, a grid system on one side of the support tower structure, the grid system for mounting various accessories, a wire management system positioned adjacent to each of the shelves, a cable management system coupled to one side of the support tower structure, and a power distribution unit coupled to the support tower structure.

BRIEF DESCRIPTION OF DRAWINGS

Various examples of embodiments of the systems, devices, and methods will be described in detail, with reference to the following figures, wherein:

FIGS. 24-26 depict example wire management hooks that may be included in the example storage and charging station system depicted in FIG. 11 to store wires for each of the devices.

Figure 1:
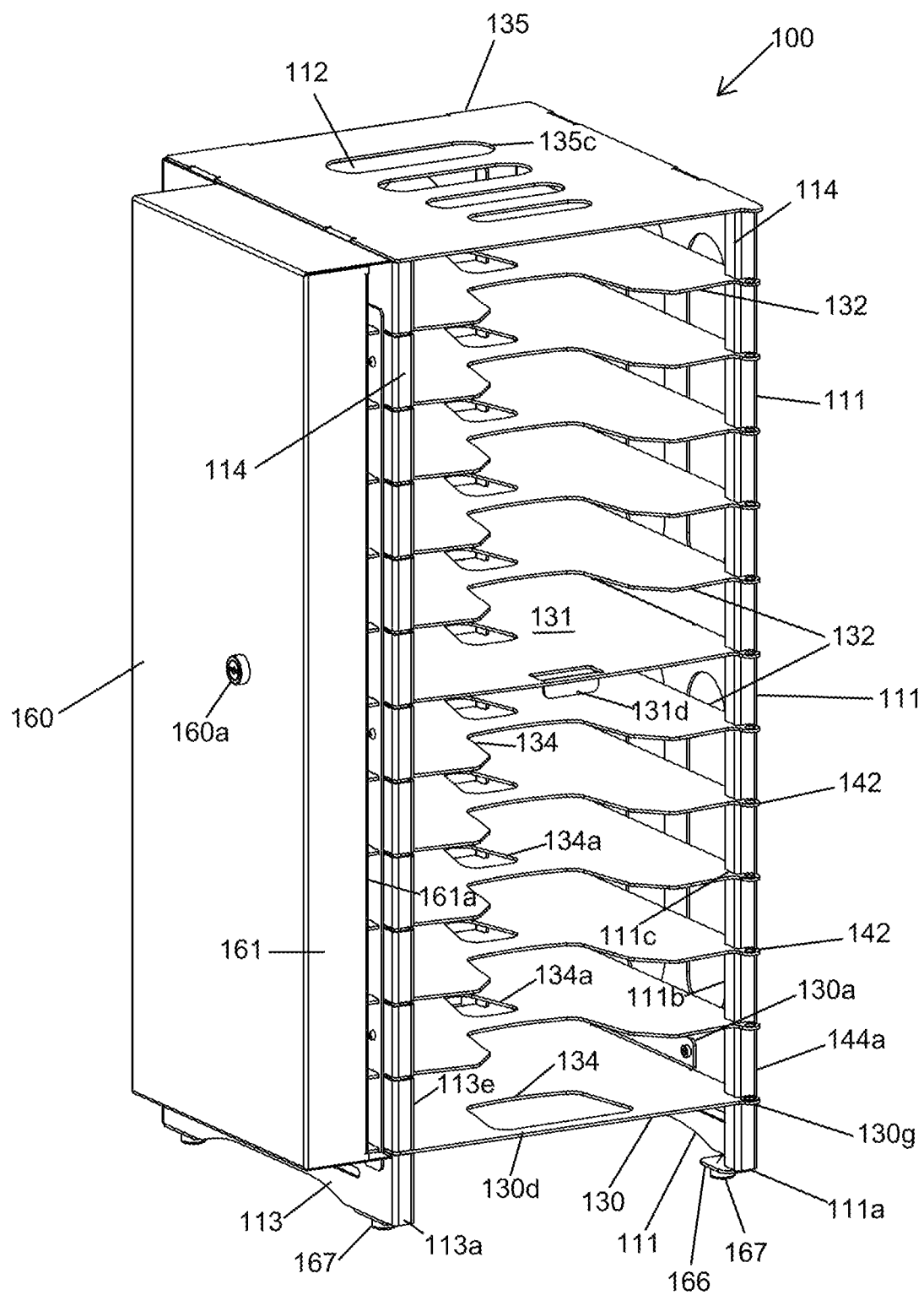
FIG. 1 is a right front isometric view of a storage and charging station system of the invention incorporating a unitary support tower cage structure for containing and supporting a plurality of vertically spaced horizontal shelves for receiving, storing and charging a plurality of mobile electronic devices.

It should be understood that the drawings are not necessarily to scale with each other, but do accurately show the disclosed details of the illustrated embodiments of the drawing. In certain instances, details that are not necessary to the understanding of the invention or render other details difficult to perceive may have been omitted. For ease of understanding and simplicity, common numbering of elements within the numerous illustrations is utilized when the element is the same in different Figures. It should be understood, of course, that the invention is not necessarily limited to the embodiments illustrated herein.

DETAILED DESCRIPTION

The invention illustrated in the Figures and disclosed herein is generally directed to one or more embodiments of a storage and charging station system having a unitary support tower cage structure for enclosing mobile electronic devices. For ease of discussion and understanding, the following detailed description will at times refer to a "mobile electronic device" 50, or a "plurality of mobile electronic devices" 50. While the Figures illustrate a mobile electronic device 50 as a laptop computer, it should be appreciated that a mobile electronic device 50 may be any suitable mobile electronic device requiring storage and/or battery charging or recharging. For example, a mobile electronic device 50 may include, but is not limited to, a laptop computer, a netbook computer, a notebook computer, a Google Chromebook™ computer, a tablet computer device (such as an Apple iPad®, Samsung Galaxy® or Microsoft Surface®), a mobile smartphone, or any other known or future developed mobile electronic device. The size of the unitary support tower cage structure can vary depending upon the size and number of mobile electronic devices to be accommodated, without loss of function.

Figure 2:
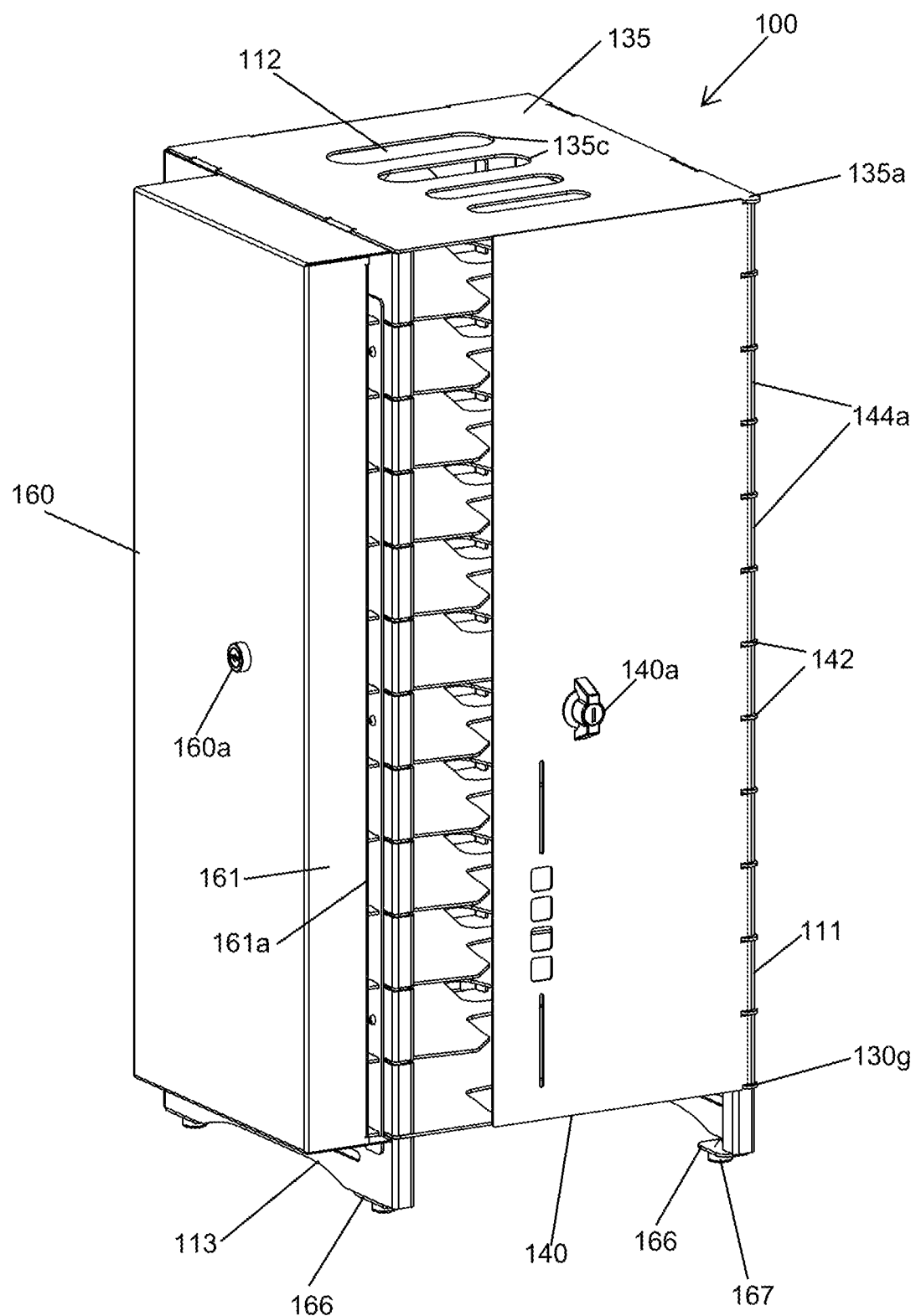
FIG. 2 is a right front isometric view of the storage and charging station system of FIG. 1 wherein a pivotal and lockable main door has been added for the purpose of securing visible mobile electronic devices supported within the unitary support tower cage structure.
Figure 3:
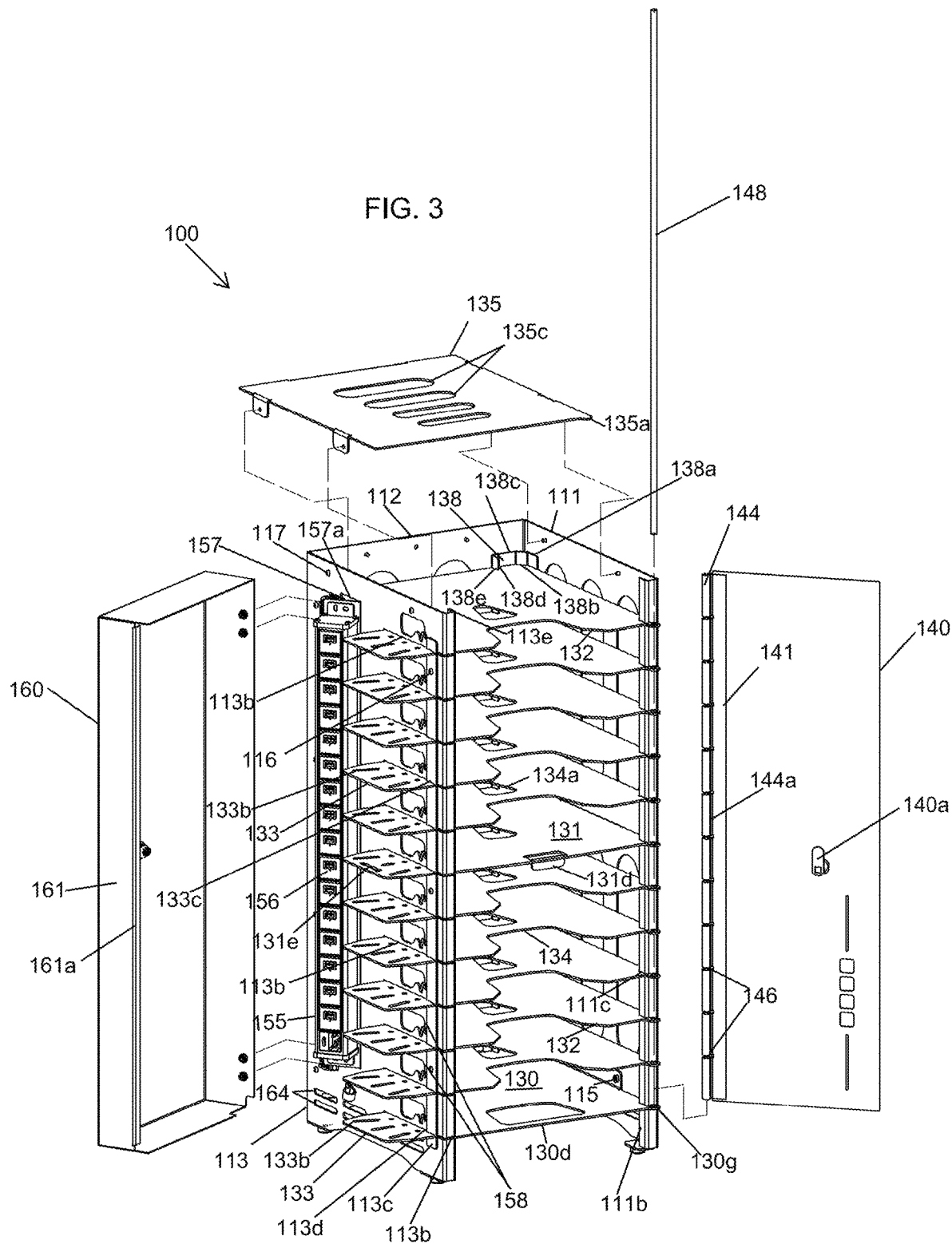
FIG. 3 is an exploded right front isometric view of the storage and charging station system of FIG. 2 for further illustration of the various components thereof.

Referring now to the Figures, FIGS. 1-6 respectively illustrate embodiments of a storage and charging station system 90 having a tower assembly 100 for enclosing a plurality of mobile electronic devices 50 in a vertical array. The tower assembly 100 comprises a unitary support tower metal cage structure 110 including at least a first vertically extending side panel 111, a second vertically extending rear panel 112 coupled to the first side panel 111 and extending horizontally therefrom at an angle thereto, and a third vertically extending side panel 113 coupled to the rear panel 112 and extending horizontally therefrom at an angle thereto and in generally opposed relation to the first panel 111. FIG. 3 best shows the vertical panels 111, 112 and 113, which are advantageously formed integrally from a planar metal sheet to provide three connected vertical panels standing at generally right angles, with the first side panel 111 and third side panel 113 in generally parallel opposed relation. It can be seen from the drawings that each of said opposed side panels 111 and 113 has integral, inwardly extending formed front frame members 111a and 113a, respectively, with rearward extending formed flanges 111e and 113e, which are positioned parallel to each other to define the width of the front frame opening 114. The formed front frame members 111a and 113a, and rearward formed flanges 111e and 113e add lateral stiffness to the side walls and overall tower cage structure 110 and avoid any forward sharp material edges in the exposed cage structure. The described cage structure 110 may be advantageously formed on a brake press from a single sheet of aluminum of a desired thickness. Support base flanges 166 may be further formed inwardly from opposite ends of the bottoms of side panels 111 and 113 into horizontal positions in planar relation, and preferably each fitted with a base pad support 167, which may or may not include a conventional threaded leveler feature (not shown), to efficiently provide stable peripheral support for the cage structure 110. For tower assemblies 100 of 12 to 24 shelf size and capacity, as shown and described herein with reference to an exemplary 12 shelf tower cage structure 110, an aluminum panel sheet thickness of 0.090 inches has been found to provide suitable strength and cage rigidity to provide stable support for such storage and charging systems 90, loaded as described herein. Other existing or to be discovered sheet metal material, including mild steel and stainless steel, which provide suitable forming, strength, rigidity, weight and cost characteristics, may be utilized without departing from the spirit of the invention. Typically, any margins, openings, holes, slots and notches in the tower cage structure hereinafter described will be accurately cut or punched by a laser machine, or mechanically punched, in the metal sheet stock prior to the forming steps previously described.

Figure 8:
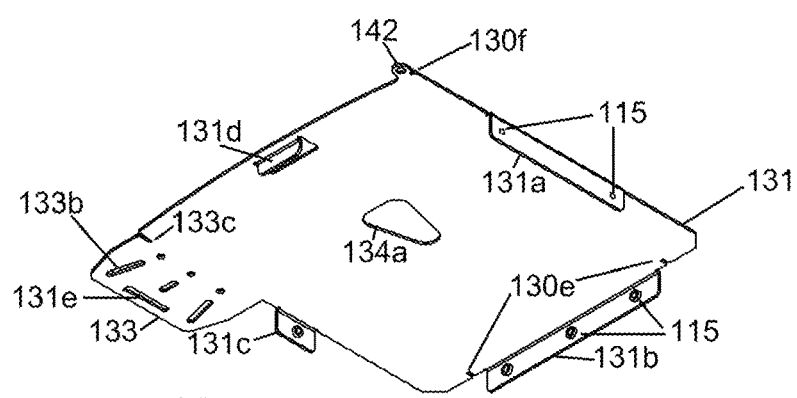
FIG. 8 is a left front isometric view of the underside of the downwardly flanged middle support shelf.

FIG. 3 illustrates how the three vertically extending panels 111, 112 and 113 are further connected to form a substantially rigid vertical support tower cage structure 110. In preferred order of assembly, a flanged unitary bottom support shelf 130, shown in more detail in FIG. 9, and also typically formed from similar aluminum sheet stock, is provided having a first upwardly extending side flange 130a for fastening to the lower portion of the inside surface of the first vertically extending side panel 111, a second upwardly extending rear flange 130b for fastening to the lower portion of the inside surface of the second upwardly extending rear panel 112, and a third upwardly extending side flange 130c for fastening to the lower portion of the third upwardly extending side panel 113. In each case, threaded holes 115 may be pre-punched and threaded in the upwardly extending flanges 130a, 130b, and 130c for engaging screw fasteners 116 extending through adjacent punched or cut panel fastener holes 117 in the associated cage panels and screwed into the threaded holes 115 of the flanges to securely connect the bottom support shelf 130 to the three vertically extending panels 111, 112 and 113. Likewise, a middle support shelf 131, shown in more detail in FIG. 8, is provided with similar, but preferably downward extending flanges 131a, 131b and 131c, with similar punched and threaded holes 115 for engaging screw fasteners 116 extending through punched panel fastener holes 117 in the middle portion of the three vertically extending panels 111, 112 and 113, in the same manner as described above for the bottom support shelf 130.

However, during assembly of the illustrated vertical tower cage structure 110, before either the bottom support shelf 130 or the middle support shelf 131 are fixedly connected to the three vertically extending panels 111, 112, and 113, a plurality of intermediate flat support shelves 132, which may be generally similar in marginal shape to the planar portions of the bottom shelf 130 and middle shelf 131 but have no flanges, will also be positioned within the support tower cage structure 110. As shown in FIG. 3, the shelves 130, 131 and 132 are planar sheets, except for the described flanges of the bottom and middle shelves 130 and 131. In addition, all of the common planar portions of the shelves may have the same marginal outer shape, including common side support shelf portions 133 if present, which are each adapted to protrude through a one of an adjacent, vertically spaced, array of horizontal shelf support slots 113b in the third upwardly extending panel 113 of the support tower cage structure 110. Additionally, each of the shelves except the middle shelf 131 and bottom shelf 130 have a substantially U-shaped front cut-out portion 134 to facilitate user grasping and removal of generally rectangular mobile electronic devices 50 positioned on the shelves and partially spanning the cut-out portions 134. Additionally, all of the support shelves except the bottom support shelf 130 are shown to have an additional finger opening 134a located behind the cut-out portions 134 to permit users to push up on the underside of a mobile electronic device 50 supported by a shelf to further facilitate easy removal of mobile electronic devices 50 from the tower assembly 100. The bottom support shelf 130 may have a front margin 130d which spans its cut-out portion 134 to provide additional marginal security structure for the bottom support shelf 130.

Figure 9:
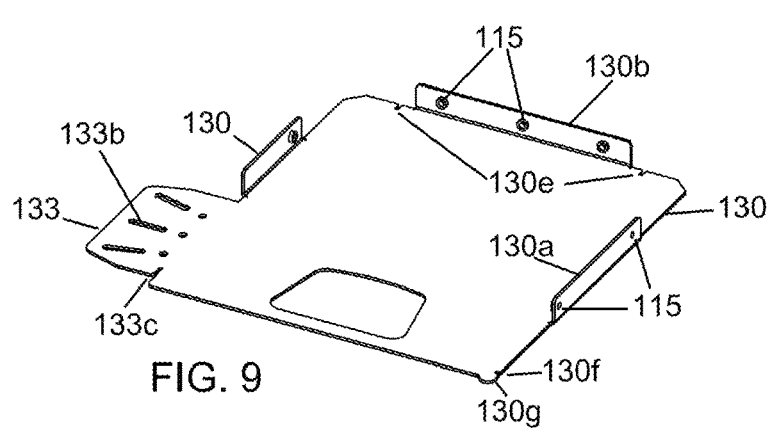
FIG. 9 is a left front isometric view of the upper side of the upwardly flanged bottom support shelf.

Before the flanged bottom shelf 130 and flanged middle support shelf 131 are connected, the first side panel 111, second rear panel 112 and third side panel members of the unitary support tower cage structure 110 are sufficiently flexible so that the front frame opening 114, defined by the double bended front vertical edges of the vertical side panels 111 and 113, respectively, can be widened slightly by flexing the side panels 111 and 113 sufficiently to permit the bottom support shelf 130, middle support shelf 131 and all of the intermediate support shelves 132 to be easily inserted between the flexed side panels in a spaced vertical array, with the side support shelf portion 133 of each said shelf sliding and protruding through an adjacent vertically spaced horizontal shelf support slot 113b extending rearward from the front vertical edge 113a of third side panel 113. Further support for the support shelves 130, 131 and 132 can be seen from FIG. 3, with reference to the top shelf 132 exposed by the exploded position of flanged cover panel 135. FIGS. 8 and 9 show a shelf left front engagement finger slot 130f, common to all shelves, for engaging first panel inwardly extending, spaced horizontally slotted, front frame member 111a and for retaining shelves 130, 131 and 132 in respective position within the tower cage structure 110. The additional connecting structure and relationship to the shelf support structure of tower cage structure 110 is typically similar for all of the support shelves 130, 131 and 132, unless otherwise noted.

Figure 7:
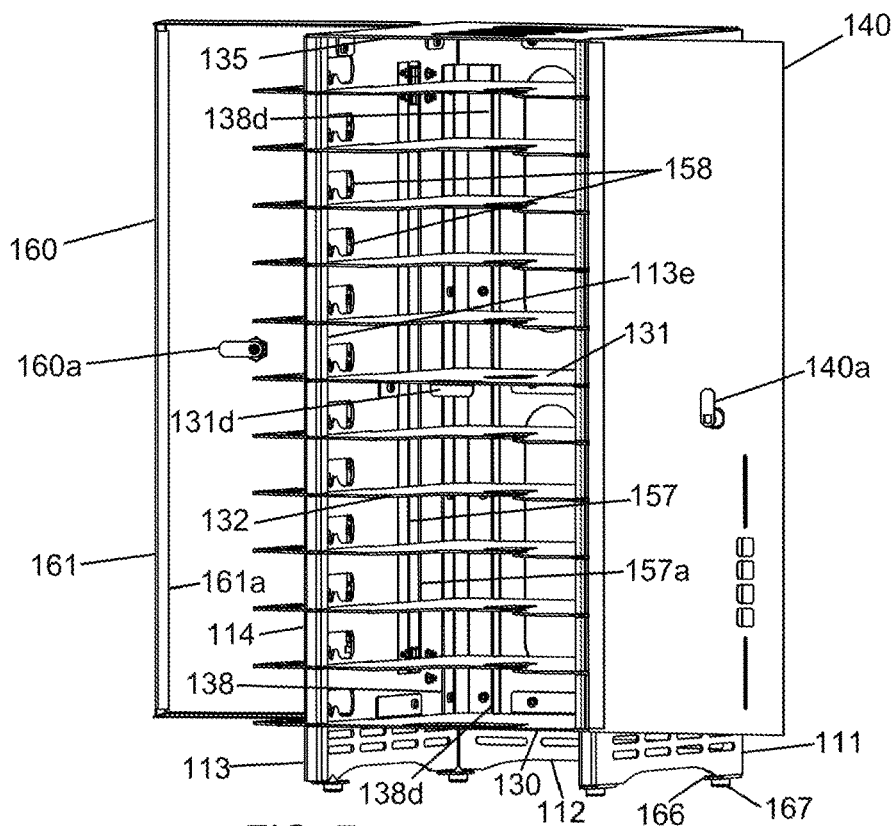
FIG. 7 is a left front planar view of the storage and charging station system of FIG. 2, wherein the main door and side cover door are in open positions and the inside surfaces of the second vertically extending rear panel and the third vertically extending side panel of the tower cage, and structure supported thereon, are illustrated.

Rear channel shelf supports 138 extend vertically upward within the rear inside corners of the unitary support tower cage structure 110 formed by the illustrated substantially right angle bends between the vertically extending first side panel 111 and second rear panel 112, the upper end of which is visible in FIG. 3, and likewise between the second rear panel 112 and the third side panel 113, which is identical in opposition position and placement, but reversed in orientation, as shown in FIG. 7. Each illustrated rear channel shelf support 138 has a side wall engagement flange 138a positioned flush against the inside surface of the adjacent side panel 111 or 113, and fastened thereto. The rear channel shelf supports 138 each further include an angle member 138b which bridges the proximate inside cage corner formed by the first side panel 111 and second rear panel 112, or formed by the second rear panel 112 and the third side panel 113, and an inner flange 138d which may extend inwardly at a right angle from the rear member 138c, which is positioned flush against and fastened to rear panel 112. It can be seen in FIGS. 4 and 5, that four screws 116 are positioned in vertically spaced relation through each of said side panels 111, 112 and 113 on either side of the two outside cage corners formed between side panels 111, 112 and 113, and thereby engaged with similarly vertically spaced punched and threaded holes 115 in the two rear channel support members, see FIG. 7, in a similar manner as described previously with respect to attachment through the rear panel of the shelf flanges to the cage panels. More specifically, the screw fasteners 116 which extend to the rear channel 138 through the rear panel 112 engage threaded holes 115 in the rear channel support rear member 138c. The screw fasteners 116 which extend through the side panels 111 and 113 to the rear channel 138 through the side panels 111 and 113 engage threaded holes 115 in the rear channel support side wall engagement flange 138a. As shown, the rear channel shelf support members 138 separately connect the rear panel 112 to each of the side panels 111 and 113 and provide additional stiffness and rigidity to the support cage structure 110. The inner ends of each vertical inner flange 138d are multiply slotted for a first portion of the inside horizontal length of each inner flange to form spaced horizontal finger groove interlocking shelf support slots 138e for engagement of an aligned finger slot 130e in the inner end of each one of the plurality of horizontal support shelves 130, 131 and 132. Typically, the aligned shelf finger slots 130e are each as long as the remaining non-slotted portions of the inside horizontal length of the vertical inner flange 138d. The horizontal end slots 138e and of each rear channel shelf support 138 can be vertically spaced at the same heights as the corresponding horizontal shelf support slots 113b in the third vertically extending side panel 113. Thus, the rearward end of each engaging support shelf 130, 131, or 132, respectively, is doubly both vertically and horizontally supported in an aligned generally horizontal position. Likewise, double plane frame member 111a of vertical side panel 111, which partially defines the front frame opening 114, includes a vertical array of horizontal slots 111c aligned with opposed double plane frame member 113a, each of which slots 111c terminate short of the vertical side panel 111 to respectively provide finger slot end engagement with each shelf left front corner finger slot 130*f* of the vertical array of engaged support shelves 130, 131 and 132, to both support and retain the shelf left front corners within the support tower structure 110. As noted above, opposed aligned horizontal shelf support slots 113*b* of vertical side panel 113, by contrast, extend to the outer plane of panel 113, and further extend rearward within side panel 113 to support the full length of the side support shelf portions 133. In addition, each of the support shelves 131 and 132 includes a hinge rod retaining ring 142, which rings 142 extend forwardly from the shelf left front corners, as shown in FIGS. 8 and 9, and are aligned adjacent double plane frame member 111*a* when the arrayed support shelves are properly positioned within the unitary support tower cage structure 110, as shown in FIG. 3 and elsewhere in the drawings. Final assembly of the unitary support tower cage structure 110 then begins with connecting the upwardly flanged bottom support shelf 130 to the three integrally connected vertical panels 111, 112 and 113, as described above. This will pull the panels 111, 112 and 113 into flush engagement with the upwardly extending bottom shelf flanges 130*a*, 130*b* and 130*c*, and require the bottom shelf and many intermediate shelves 132 be brought into full alignment and close engagement with the previously described alignment and supporting structure of the unitary support tower cage structure 110.

The next assembly steps are to confirm the alignment of the intermediate shelves 132 in the middle portion of the cage panels 111, 112 and 113, with all of their points of contact and support in the cage structure, and then similarly connect the downwardly extending flanges 131*a*, 131*b* and 131*c* of middle shelf 131 to the cage panels 111, 112 and 113. In the illustrated embodiment, the bottom shelf 130 flanges and middle shelf 131 flanges are both successively fastened by two screws 116 to vertical side panel 111, three screws 116 to the vertical rear panel 112 and at least one screw 116 to the vertical side panel 113.

After all of the support shelves 130, 131 and 132 have been so positioned and fastened, a shelf retention plate 113*c*, the rear edge of which is provided with spaced horizontal finger groove shelf interlocking slots 113*d* to receive matching shelf side support finger grooves 133*c* in the front edges of each side support shelf portion 133, which side support finger grooves 133*c* are best shown in FIGS. 8 and 9, is engaged therewith and attached to the outside surface of side panel 113, as shown in FIG. 3, to fix, support and retain the shelf portions 133 and connected support shelves 130, 131 and 132 in place. The plate 113*c* may be fastened to the outer surface of side panel 113 by a plurality of screw fasteners 116 extending through holes (not shown) in plate 113*c* near the front frame member 113*a* to engage punched and threaded holes (not shown) in side panel 113, or by other suitable fastening means as previously described.

Figure 4:
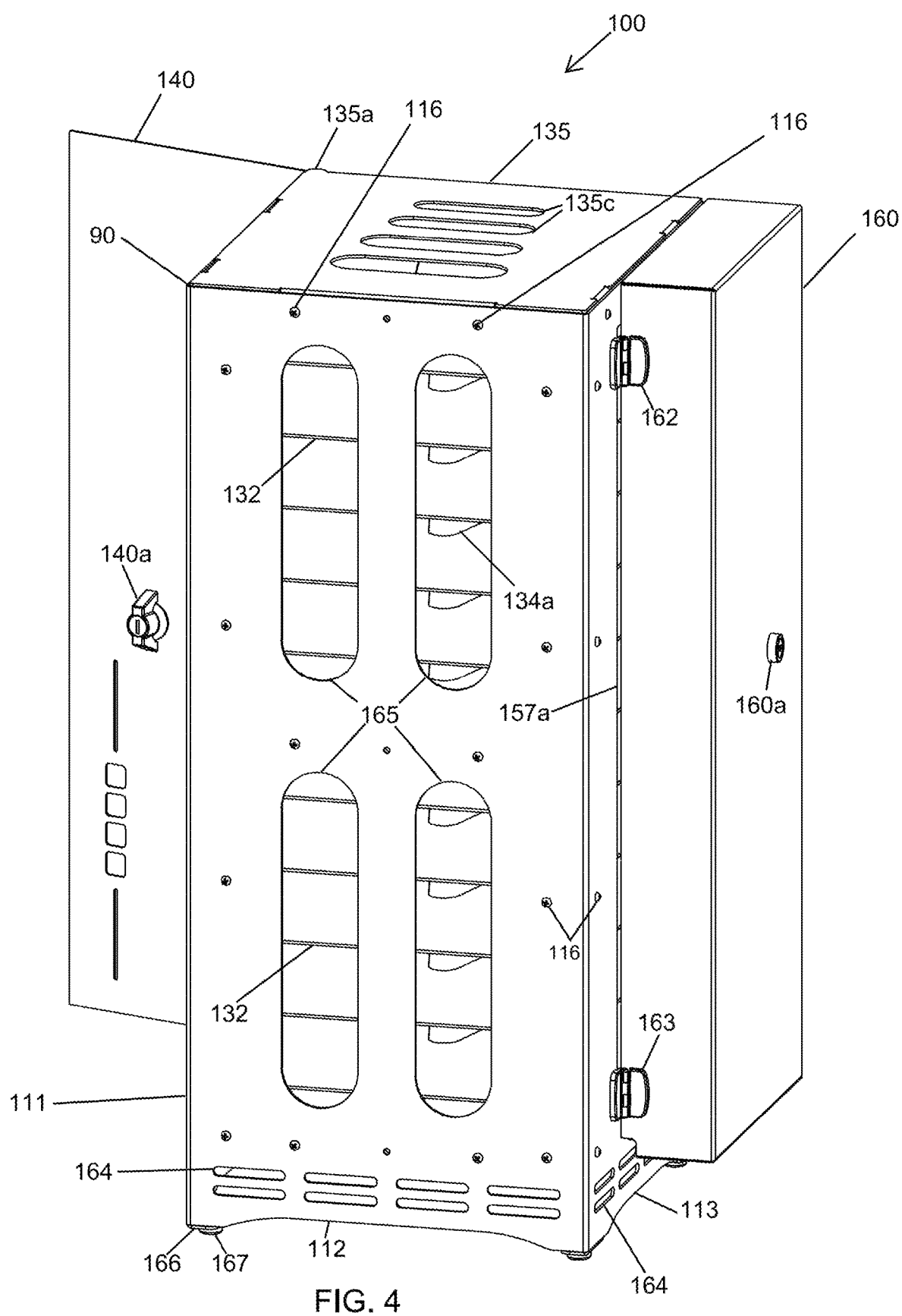
FIG. 4 is a right rear isometric view of the storage and charging station system of FIG. 2, wherein the main door is shown in a pivoted open position.
Figure 5:
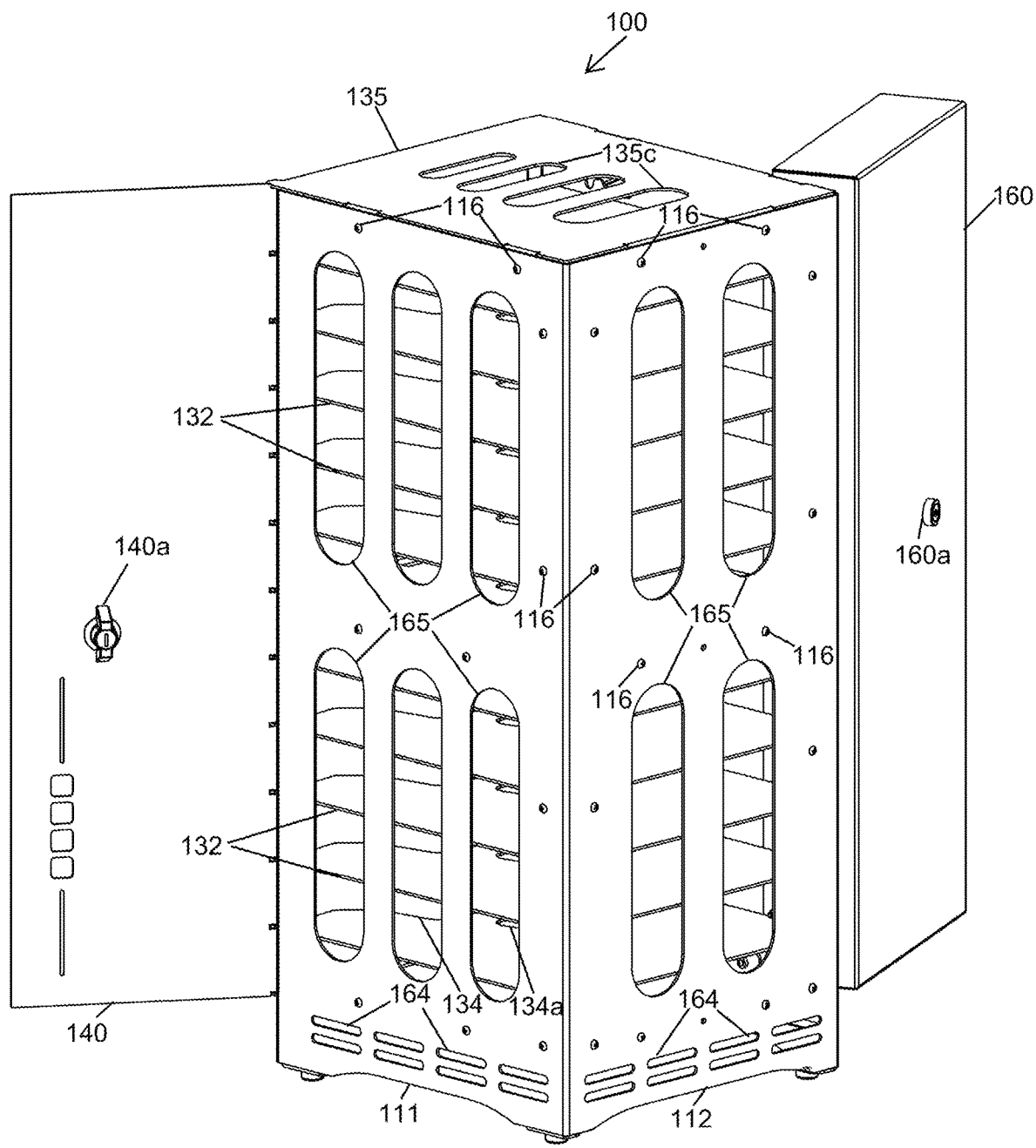
FIG. 5 is a left rear isometric view of the storage and charging station system of FIG. 2 wherein both the main door and the side cover door are shown in open positions.
Figure 6:
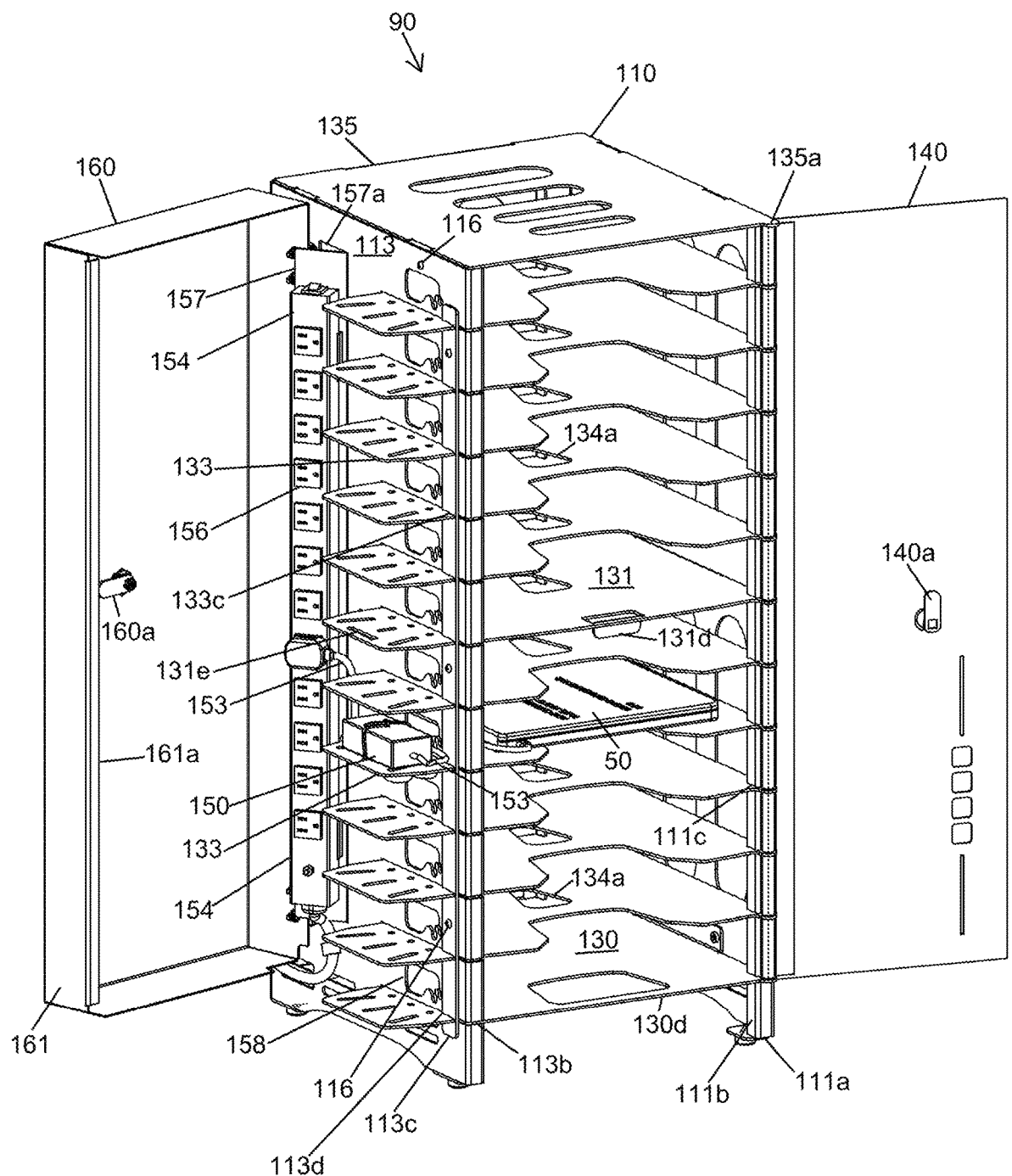
FIG. 6 is a right front isometric view of the storage and charging station system of FIG. 2, wherein the front and side doors are open to reveal the interior structural features of the unitary support tower cage structure, and wherein a mobile electronic device is shown on a support shelf and a charging device is shown positioned on a side support portion of said support shelf with electronic connection to an adjacent 120 power strip and to the mobile electronic device for charging.

Assembly of the unitary support tower cage structure 110 is then completed by fastening a flanged cover panel 135 to each of the panels 111, 112 and 113 near their upper edges, as shown in FIGS. 4-6. Thus, two or more first side cover flanges 135*a* which extend downwardly from the cover first side are fastened to the upper portion of the inside surface of the vertically extending first side panel 111 by two suitable screw fasteners 116 engaged with punched and threaded holes 115 in the cover flanges 135*a*, as previously described with respect to attachment of the flanges of the bottom shelf 130 and the middle shelf 131. In the illustrated embodiment, a single rear cover flange 115*b* with three punched and threaded holes 115 extends downwardly from the cover rear side and is similarly fastened by three screws 116 to the upper portion of the rear inside surface of the second vertically extending rear panel 112, and two or more third side cover flanges 115*c* extend downwardly from the cover third side and are similarly fastened to the upper portion of the third vertically extending side panel 113. It should be understood that the screw fasteners 116 and punched and threaded flange fastening holes 115 shown and described herein may be substituted for by any commercially available type of compact fasteners combinations which are presently known or yet to be designed, including commercially available PEM® nuts, rivets of various designs, threaded bolts or screws, various bolt and nut combinations, or any other known and commercially available suitable fasteners. Applicant has chosen the preferred illustrated and referenced punched and threaded holes 115 and fastening screws 116 for connecting the structural members of the substantially rigid vertical tower assembly 100 based upon their various qualities of strength, convenience of assembly and minimal appearance qualities, but other suitable known fasteners would be functionally suitable as well.

FIG. 3 and FIG. 6 further illustrate the side support shelf portions 133 each protruding through one of the horizontal support slots 113*b* of third vertical side panel 113 from their associated support shelves 130, 131 and 132, to support transformers 150, one of which is exemplarily shown in FIG. 6, and connecting electronic cables 153 extending from a power source which may comprise power outlets 156 of a 120 volt power strip 154 to transformer 150 and then, as shown, to an assigned mobile electric device 50 supported by a one of the associated support shelves 130, 131 and 132. Alternatively, as shown in FIG. 3, a USB power strip 155 may be provided for conventional connection of USB cables extending directly to assigned mobile electronic devices positioned on the support shelves 130, 131 and 132. The support shelf portions 133 are each provided with cable management slots 133*b* of any desired configuration to conveniently 'store' any excess length of input or connecting cable 153. The third vertical side panel 113 defines a cable management access aperture 158 above each horizontal support slot 113*b* for accessing a selected length of an associated power output cable 153 to an assigned mobile electronic device 50 positioned upon the adjacent surface of an associated support shelf 130, 131 and 132, as exemplified in FIG. 6, for ease and convenience of connection and disconnection of the power output cable 153 to the mobile electronic devices 50 by individual users. The power strips 154 and 155 and associated electrical and electronic outlets 156 are each shown herein projecting through angled mounting flange 157 cut and angled outwardly from the third vertical side panel 113 of the vertical tower cage structures 110 of FIGS. 3 and 5. A side cover 160 is pivotally connected to the vertical side panel 113 by internally fastened upper hinge 162 and lower hinge 163. A lockable steel latch 160*a* on the side cover 160 registers with cover latch receiver slot 131*e* on the side support shelf portion 133 of flanged middle support shelf 131, to provide security for the power bricks and connected input and output cables supported on the side support shelf portions 133. The front side panel 161 of the cover 160 may include a shortened formed inner edge 161*a* to permit a limited external view of the side support shelf portions 133 and any supported electronic components when the cover 160 is closed and locked, and provide ventilation for any electrical components on the side support shelf portions 133. Such shortened front panel inner edge 161*a* also permits users to extend the ends of connecting electronic cable 153 out through the opening between the cover inner edge 161*a* and the panel side wall 113, and around the front frame member 113*a* for convenient engagement with the charging ports of mobile electronic devices 50 positioned on the shelves 130, 131 and 132 for storage and charging.

FIG. 1 illustrates an "open tower" embodiment of the invention for use by owner organizations in which security is not a concern, and/or whose users can at any time select any charged and available standard organization-owned mobile electronic device 50 to access user cloud-stored programs and data, and conversely return any low charge or discharged mobile electronic device 50 for recharging or service. In such organizations, and various other applications, convenience may outweigh mobile electronic device security concerns, and no main security door 140 may be desired by owners. The other Figures of the drawings are directed to a more secure embodiment of the present invention.

Referring to FIGS. 2-6, a planar main security door 140 may be efficiently provided with a tubular hinge housing 144 having an array of parallel cut ring slots 146 to define individual hinge housing sections 144*a*. The cut ring slots 146 are spaced apart to register with the vertically arrayed but horizontally extending hinge rod retaining rings 142 of the positioned support shelves 131 and 132, in the cage structure 110. The tubular hinge housing 144 may be fabricated by forming the slotted portion of a planar door blank over a mandrel, which may be a cylindrical hinge rod 148 itself, or over any suitable mandrel which duplicates the cylindrical structure of the hinge rod, to form the tubular hinge housing 144. A hinge flange 141 may be further provided by the remaining margin of the door sheet extending beyond the slotted portion of the tubular hinge housing 144 and formed to lie flat against the inside surface of the door 140. The door 140 is mounted on the cage structure 110 by positioning the cut tubular hinge housing sections 144*a* between the shelf retaining rings 146, and sliding hinge rod 148 vertically downward through the continuous hinge channel formed by the aligned sections of hinge housing sections 144*a* and hinge rod retaining rings 142. The flanged bottom support shelf 130 has a solid hinge rod retainer plate 130*g*, shown more clearly in FIG. 9, which extends beneath the tubular channel 144 in the same position relative to the bottom shelf as the retaining rings 146 have with respect to the shelves 131 and 132 from which they are formed. When a door 140 is provided as described, it is usually positioned on the support tower cage structure 110 prior to installation of the cover panel 135, more clearly shown in FIG. 8, which has a hinge rod cover plate extending over the installed hinge rod 148. FIG. 2 shows that the main security door 140 may advantageously not extend fully across the front frame opening 114 to permit external visual observation of the interior shelves 130, 131, and 132, and any mobile electronic devices 50 being stored and charged thereon. Accordingly, even though the door 140 is closed and locked, system administrators may determine from an external glance whether any tower shelf is empty or supports an assigned mobile electronic device 50. At the same time, the portion of the frame opening 114 not covered by the locked door 140 is not of sufficient size to permit removal of any intended stored mobile electronic devices 50 from that tower assembly 100. In addition, the portion of the frame opening 114 not covered by the locked main security door 140 advantageously provides an additional opening for facilitating transmission of electronic data to and from any mobile electronic device 50 within support tower cage structure 110, as well as ventilation and cooling of the tower assembly 100. Where maximum security is desired, the main door 140 for the tower cage structure 110 may be fabricated from 14-gauge steel, as can be the cover panel 135, and hinge rod cover plate. The hinge rod 148 is also preferably steel. A lockable steel latch 140*a* is shown on main door 140, which when locked engages door latch retainer flange 131*d* extending downwardly from middle support shelf 131, which may also be made from 14-gauge steel for compatibility with steel latch 140*a*. Such steel construction will substantially deter unauthorized attempts to remove mobile electronic devices 50 from the illustrated tower assemblies 100.

FIGS. 3-6 and 10 illustrate important further advantages of the unitary support tower cage structure 110 of the invention, namely the ability to define a plurality of substantial multi-functional openings in the vertical panels 111, 112 and 113, and the cover panel 135, while maintaining the structural stability and support strength of the cage structure itself. In addition to the plurality of vertically spaced horizontal shelf support slots 113*b* and cable management access openings 158 illustrated in FIGS. 3 and 6, vertical ventilation opening 157*a*, identified in FIGS. 3 and 6, created by the partial displacement from vertical panel 113 of the angled mounting flange 157 for the illustrated USB and 120 volt power strips 155 and 154 provides additional ventilation for the electrical components, including any transformers 150 positioned on the side support shelves 133, when the pivotal side cover 160 is closed during normal operation of the storage and charging system 90.

FIGS. 4 and 5 further illustrate the presence of lower horizontal ventilation slots 164 positioned below the level of the planar bottom shelf 130 within all three vertical side panels 111, 112 and 113. All such lower ventilation slots 164 enable convection currents to draw cooling air into the support cage 110 through the slots 164 and flow upwardly through openings in the horizontal support shelves 130, 131 and 132 to provide ventilation and cooling to mobile electronic devices 50 being charged on the support shelves. Additional cover plate ventilation openings 135*c* exhaust such upwardly moving air to the surrounding environment.

FIG. 5 further illustrates that the vertical side panel 111 and vertical rear panel 112 of the preferred embodiment of FIGS. 1 and 2, may each include a plurality of vertically extending multifunctional observation, ventilation and transmission (OVT) openings 165 of substantial size. It can be seen that vertical rear panel 112 has two upper OVT openings 165 and two lower OVT openings 165, which upper and lower OVT openings 165 likewise freely enable direct unimpeded transmission of electronic communications to and from mobile electronic devices 50 located on any support shelf within the metal support tower cage structure 110, thus permitting electronic updating and electronic response by the mobile electronic devices 50 to data queries during periods of storage and charging, even though the mobile electronic devices 50 are securely within the unitary metal cage structure.

Figure 10:
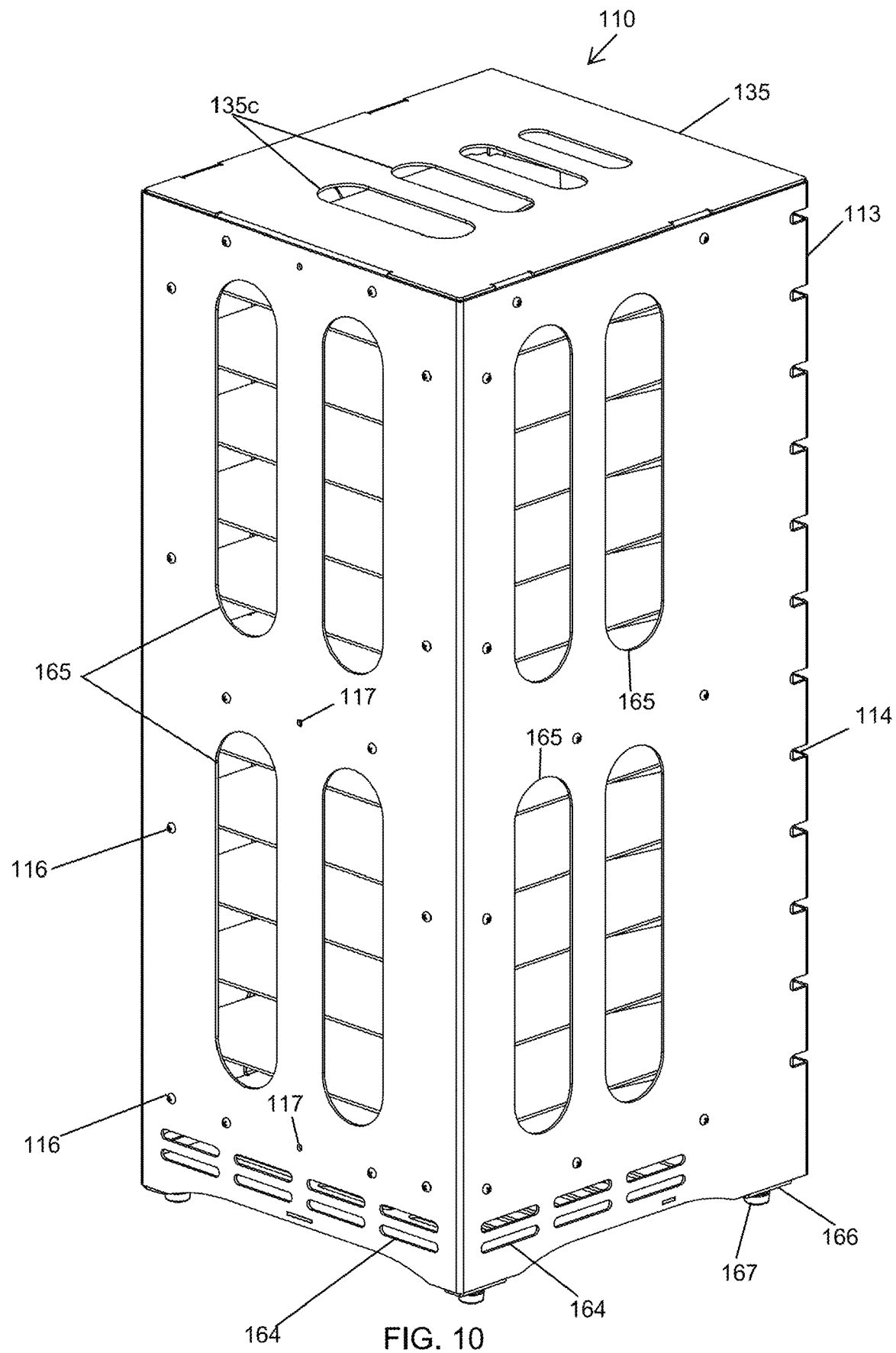
FIG. 10 is a left rear isometric view of an embodiment of the invention, wherein the third vertically extending side panel of the support tower cage structure does not have vertically spaced horizontal shelf support slots and the shelf support members are contained within the margins of the support tower cage structure without outwardly extending side support shelf portions or side cover door.

It should be understood that the sizes and shapes and number of OVT openings 165 on any side of the cage structure are variable, according to the needs and preferences of the designer, and the preferred placement of structural fasteners, brackets, flanges, support slots, cable management openings and other electrically or structurally desirable components. Relatively large OVT openings 165, as shown in FIGS. 4 and 5 which comprise between 30 and 40 percent of the area of the panels, may most efficiently be cut in the sheet stock from which the cage structure is formed by a laser machine. Alternatively, a larger number of smaller OVT round openings providing generally the same percentage of open panel area could most likely be efficiently mechanically punched. It should also be clear that any support structure, electronic components, openings, connections, brackets or any other structural components illustrated in any position or on any panel in the illustrated and described embodiments can be rearranged, reversed, inverted or otherwise alternately located without changing the functionality of the tower assembly 100 as herein illustrated and described. As examples of the flexibility of the tower assembly 100 disclosed and claimed herein, FIG. 1 illustrates a tower assembly wherein the power components are supported externally on the third panel 113, with a hinged pivotal cover 160. Such components could be alternately designed to be supported on the opposite side panel 111 in a similar manner, if desired. In such case the OVT openings 165 of side panel 111 of the presently illustrated and described embodiment could be provided on panel 113. A main lockable door 140 can be provided as in FIG. 2, or not as in FIG. 1. FIG. 10 illustrates a support tower cage structure 110 in which all three integral panels include OVT openings 165, but the OVT openings 165 of side panel 113 are set back from the front edge of the panel to permit location of a selected power supply system on or supported by the front portion of vertical panel 113. It should also be understood that while a one piece integral three-sided support tower cage structure is advantageously disclosed and provided in this specification, a more complex three piece tower could be provided by welding or otherwise coupling three vertical panels together wherein the various support slots and multifunctional openings and ventilation openings could be provided as illustrated and/or described.

Figure 11:
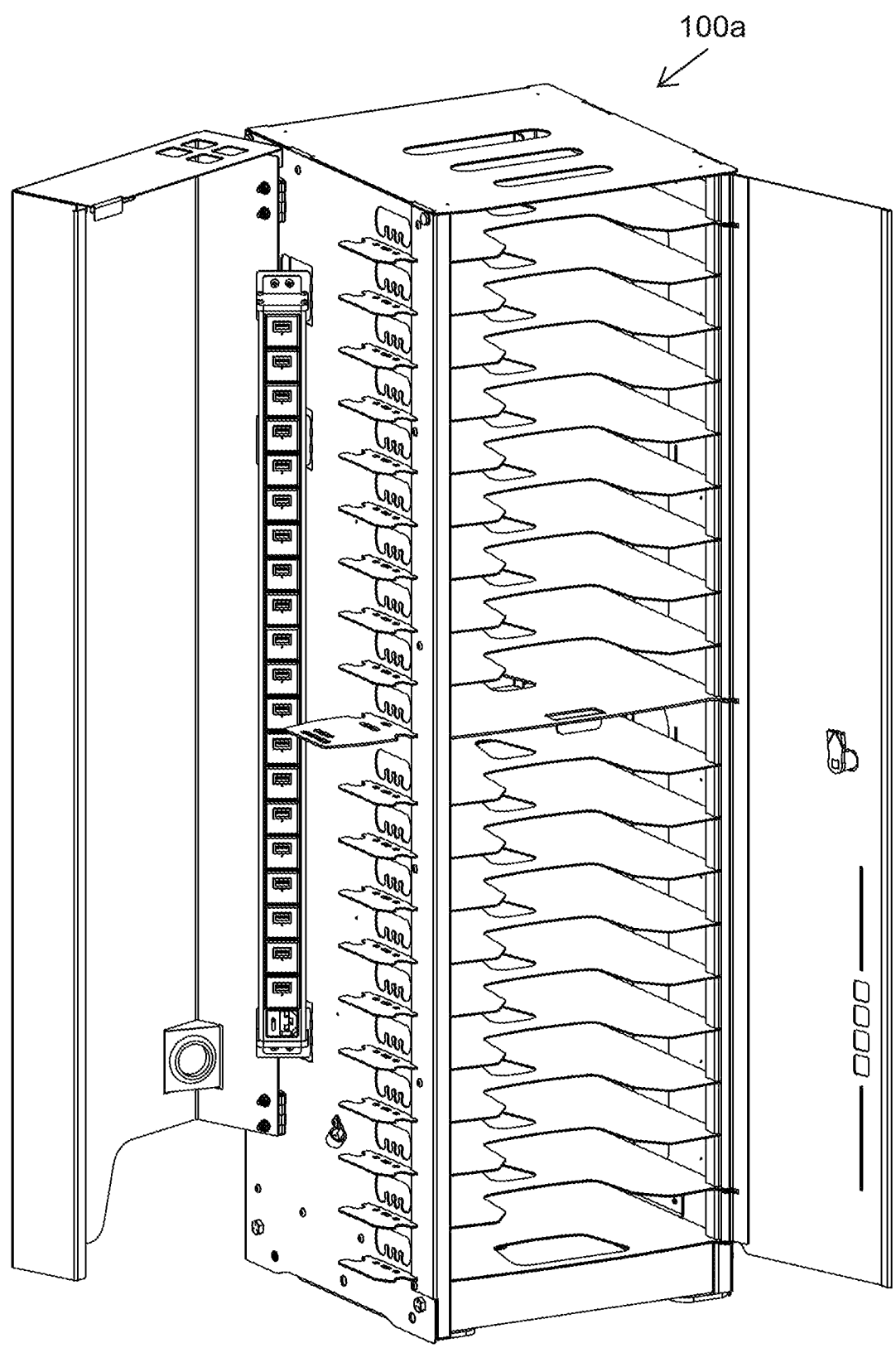
FIG. 11 is an alternative embodiment of the example storage and charging station system described herein.

FIGS. 11-14 depict various embodiments of the example tower assembly 100*a* described herein. Specifically, the figures depict different options for supporting or mounting the tower assemblies 100*a*. The different options for supporting or mounting the tower assemblies 100*a* can be used with any embodiment of a tower assembly described herein or similar to those described herein. FIG. 11 depicts an embodiment of the tower assembly 100*a* without any supporting or mounting devices. In some examples, FIG. 11 may be used in areas where there is little concern for the tower assembly 100*a* tipping or falling. Specifically, the tower assembly 100*a* without any supporting or mounting devices may be designed to sit on a desk or table in a classroom. The example tower assembly 100*a* is similar to tower assembly 100, but a different number of shelves may be included. Any number of shelves may be used with either tower assembly 100 or tower assembly 100*a*. The shelves used with tower assembly 100*a* are similar to those described in conjunction with tower assembly 100, but minor differences may exist.

Figure 12:
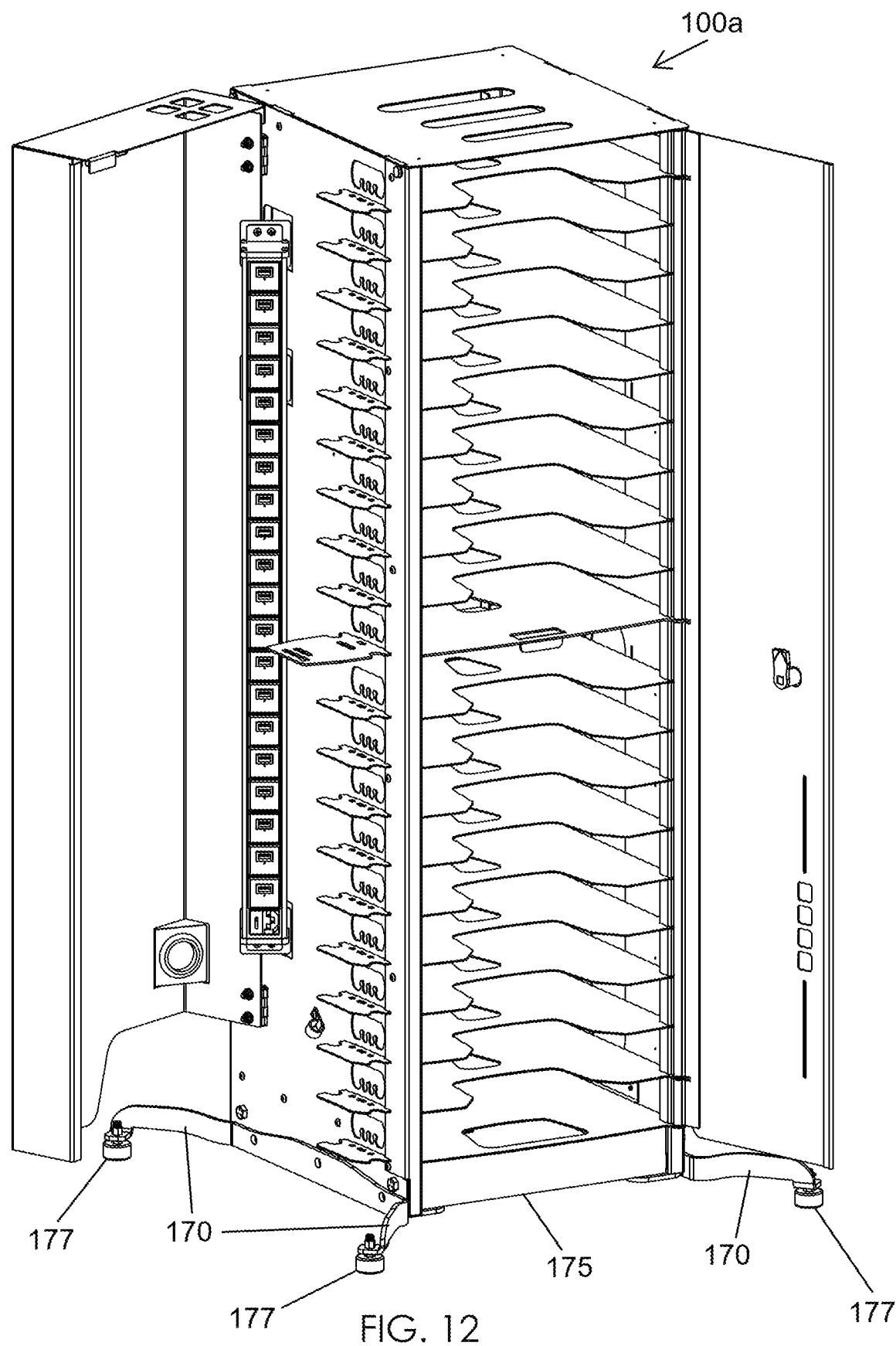
FIG. 12 depicts the alternative embodiment of the example storage and charging station system of FIG. 11 including a first embodiment of a support feature.
Figure 13:
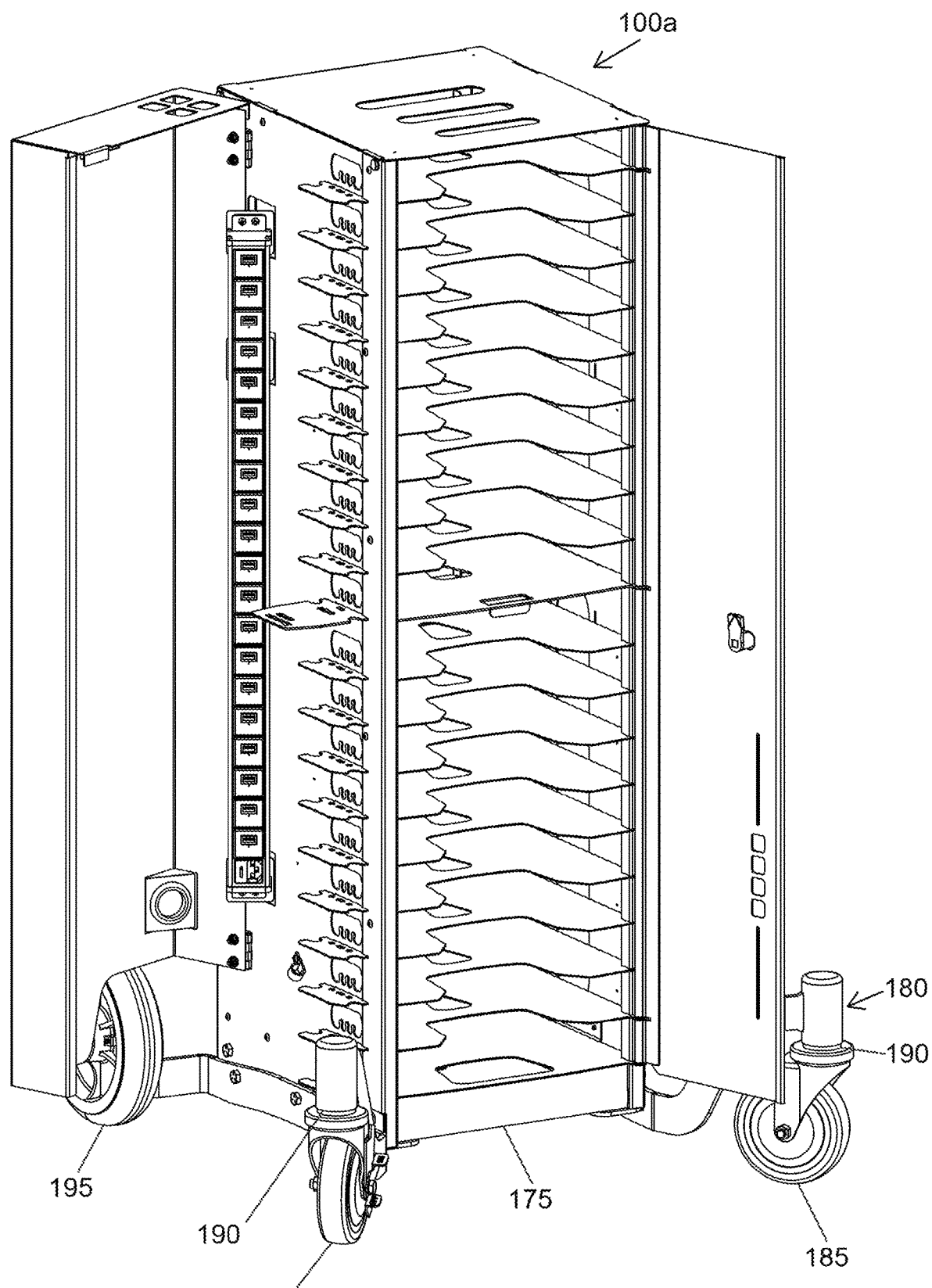
FIG. 13 depicts the alternative embodiment of the example storage and charging station system of FIG. 11 including a second embodiment of a support feature.

FIG. 12 depicts a construction of the tower assembly 100*a* including a plurality of support legs 170 attached to a bottom edge or surface 175. The tower assembly 100*a* with the plurality of support legs 170 is designed to sit on the floor, but it may also be positioned on a desk or table. To ensure the tower assembly 100*a* is level, feet 177 on each of the legs may be adjustable using a bolt or other method of slightly adjusting the height of each leg. In some such examples, the support legs 170 may be fixed to the desk or table using a mechanical fastener (e.g., bolts, straps, hooks, etc.). FIG. 13 depicts a construction of the tower assembly 100*a* including a wheeled base 180 attached to the bottom edge 175 so that the tower assembly 100*a* can be easily moved from room to room. In the illustrated example, two of the wheels 185 (e.g., the front wheels) may be on casters 190 to allow for free rotation of the wheels 185. The other two wheels 195 (e.g., the back legs) may be rotationally fixed and facing a forward direction. In some examples, one or more of the wheels 185, 195 may be lockable to keep the tower assembly 100*a* in place. The example support legs 170 and wheeled base 180 on the tower assemblies 100*a* in FIGS. 12 and 13 are designed to prevent tipping or tilting of the tower assembly 100*a*, even when a user is removing a device from the tower assembly 100*a*.

Figure 14A:
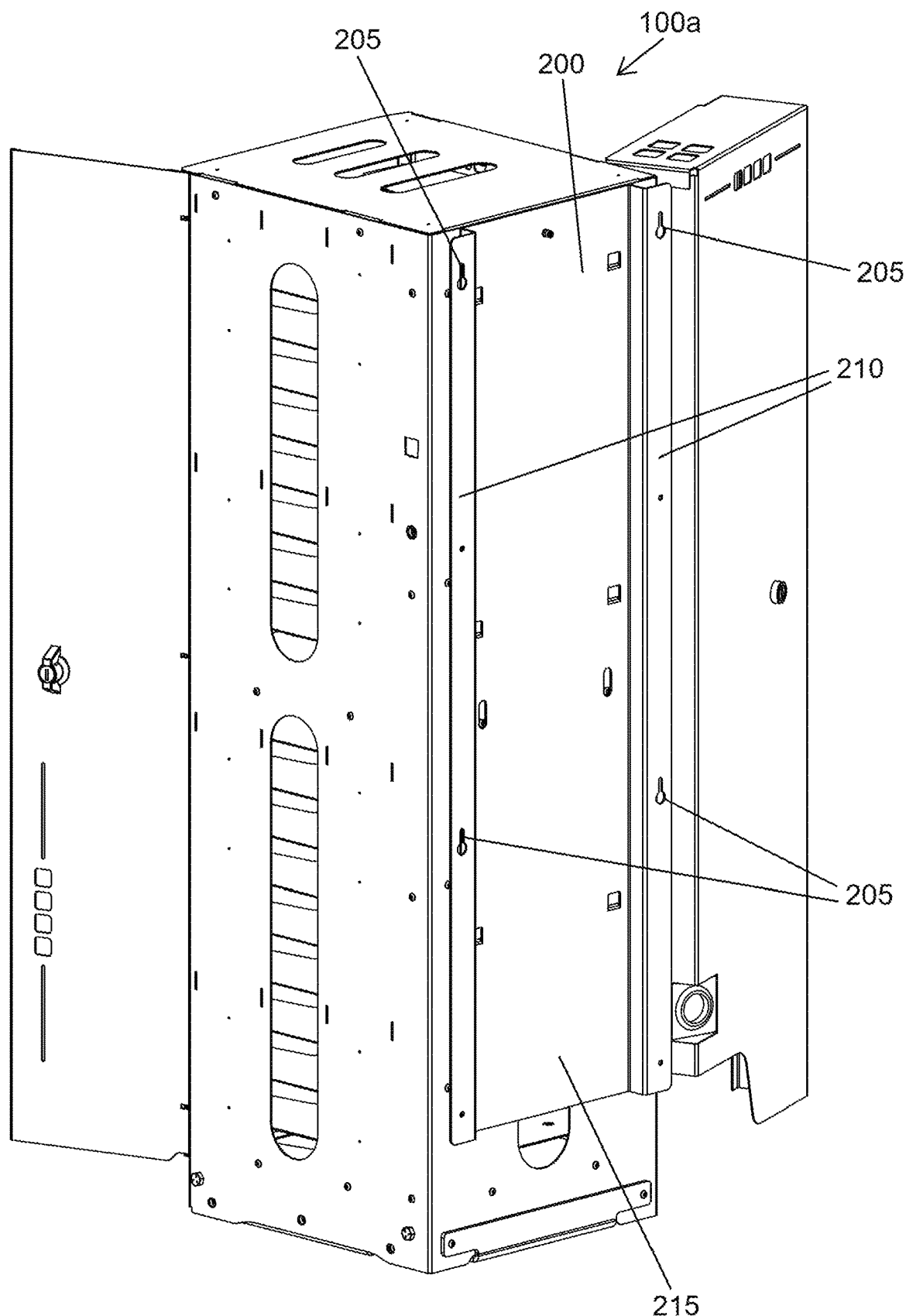
FIGS. 14A and 14B depict the alternative embodiment of the example storage and charging station system of FIG. 11 including a third embodiment of a support feature.
Figure 14B:
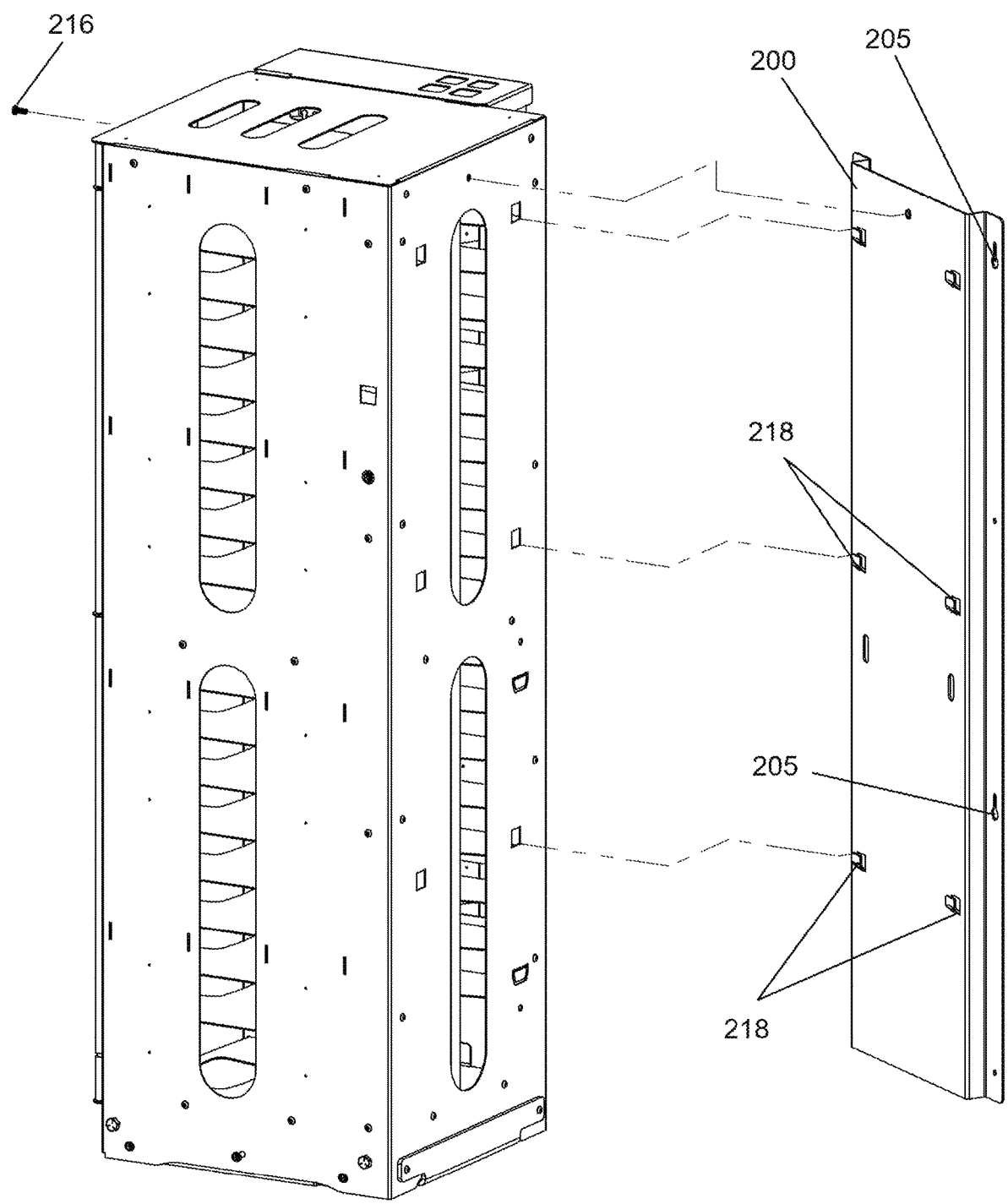
Figure 15:
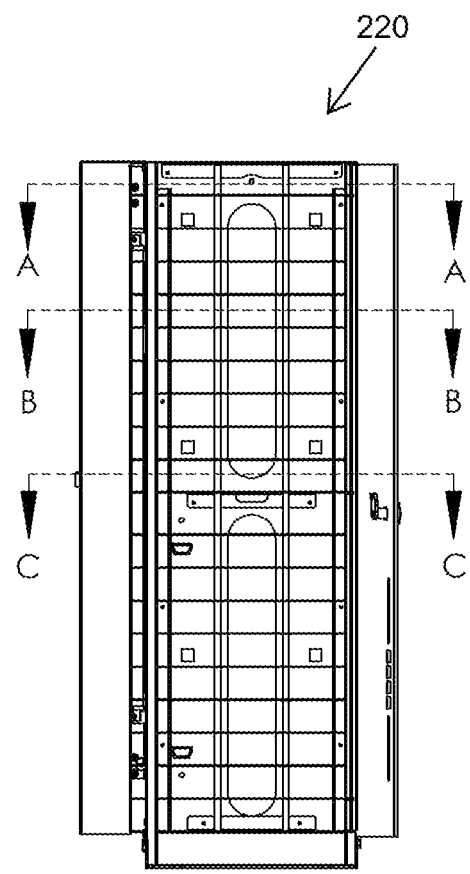
FIGS. 15-17c depict a spatial limiting system to adjust an area for a device on each shelf of the example storage and charging system of FIG. 11.
Figure 17A:
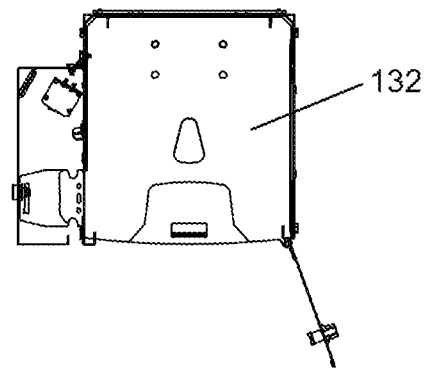
Figure 17B:
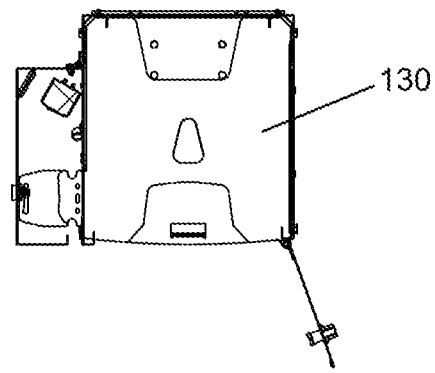
Figure 17C:
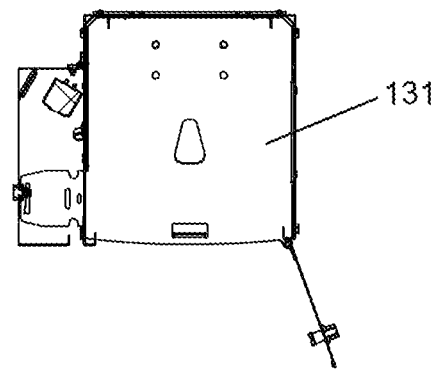

FIG. 14A depicts the alternative construction of the example storage and charging station system of FIG. 11 including bracket 200 for attaching the tower assembly 100*a* to a wall. The example bracket 200 may be connected to a back panel or side of the tower assembly 100*a* using any suitable fastening means, including bolts or screws, or more permanent means including welding. In the illustrated construction, the example bracket 200 is connected to the wall of the tower assembly 100*a* using a bolt 216 and a series of hooks 218, as shown in FIG. 14B. The example tower assembly 100*a* is attached to a wall via the bracket 200 using four screws that are positioned through four screw openings 205 or slots in the bracket 200. The screw openings 205 are positioned on edge portions 210 of the bracket 200 that are laterally offset from the central portion 215 of the bracket 200. The bracket 200 enables the tower assembly 100 to be hung at any suitable height on the wall.

Figure 16:
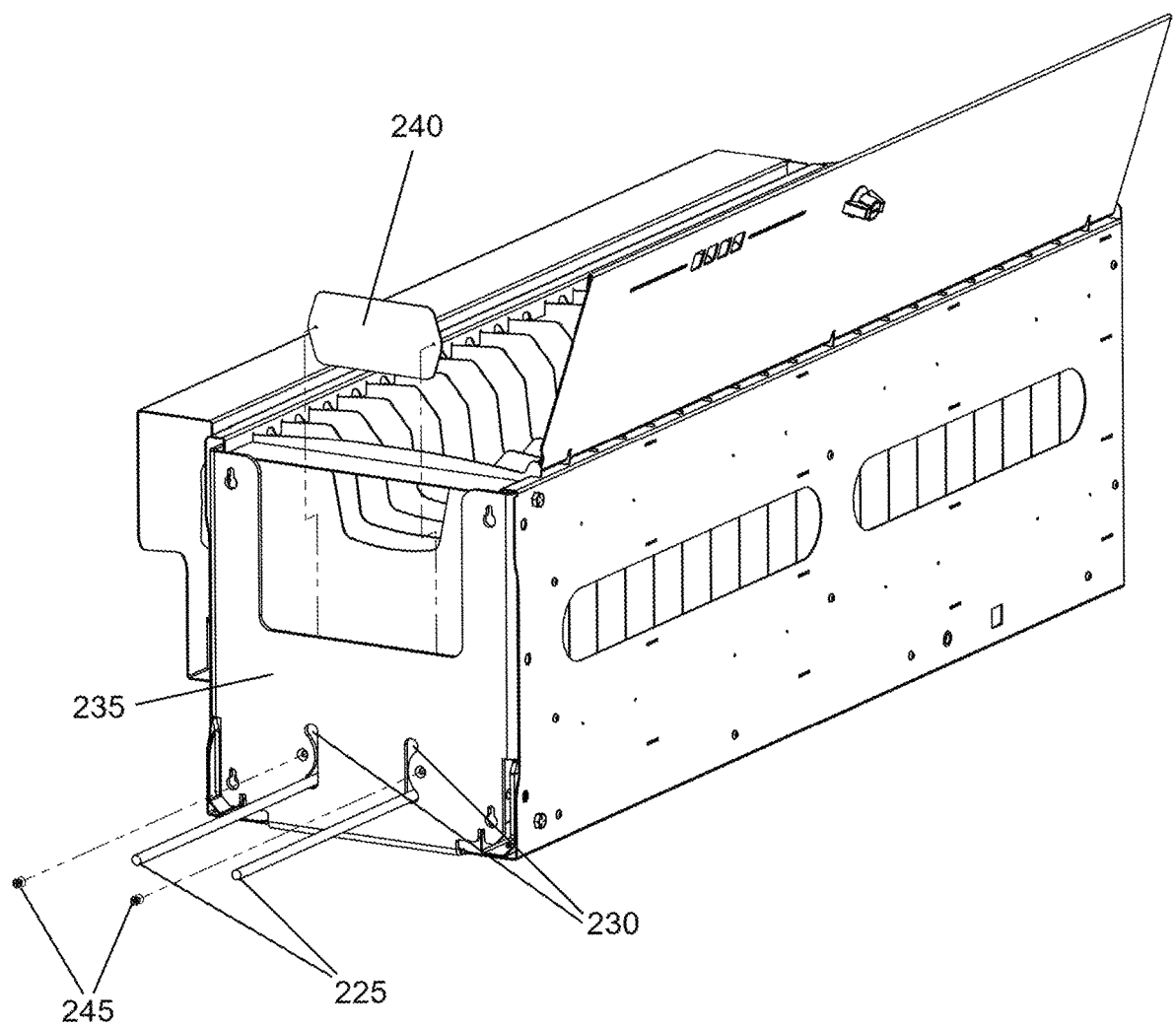

FIGS. 15-17*c* depict a spatial limiting system 220 to adjust an area for a device on each shelf 130, 131, 132 of the example storage and charging system of FIG. 11. The example spatial limiting system 220 adjusts the usable area of each shelf 130, 131, 132 to accommodate different size devices. Specifically, the spatial limiting system 220 reduces the depth of each shelf 130, 131, 132 to prevent a device sitting on the shelf 130, 131, 132 from being pushed too far back on the shelf 130, 131, 132 for a person to reach the device. FIG. 11 depicts a front view of the example tower assembly 100 including the spatial limiting system 220. The spatial limiting system 220 includes two rods 225 (e.g., acetal rods) that are used to adjust the depths of each shelf 130, 131, 132. While using acetal rods 225 may be preferred because acetal does not mar, other materials may be used for the rods instead. FIG. 16 depicts a bottom perspective view of the tower assembly 100*a* including the spatial limiting system 220. As shown in FIG. 16, the rods 225 may be inserted into the tower assembly 100*a* through openings 230 in the bottom surface 235. As shown in the section views in FIGS. 17*a*-17*c*, corresponding openings 230 are positioned in each of the shelves 130, including a middle support shelf 131, and a top shelf 132 of the tower assembly 100*a*. A retention plate 240 and mechanical fasteners 245 (e.g., screws, countersunk screws) may be used to keep the rods 225 in place. The example spatial limiting system 220 may be adjusted to multiple different depths.

Figure 18:
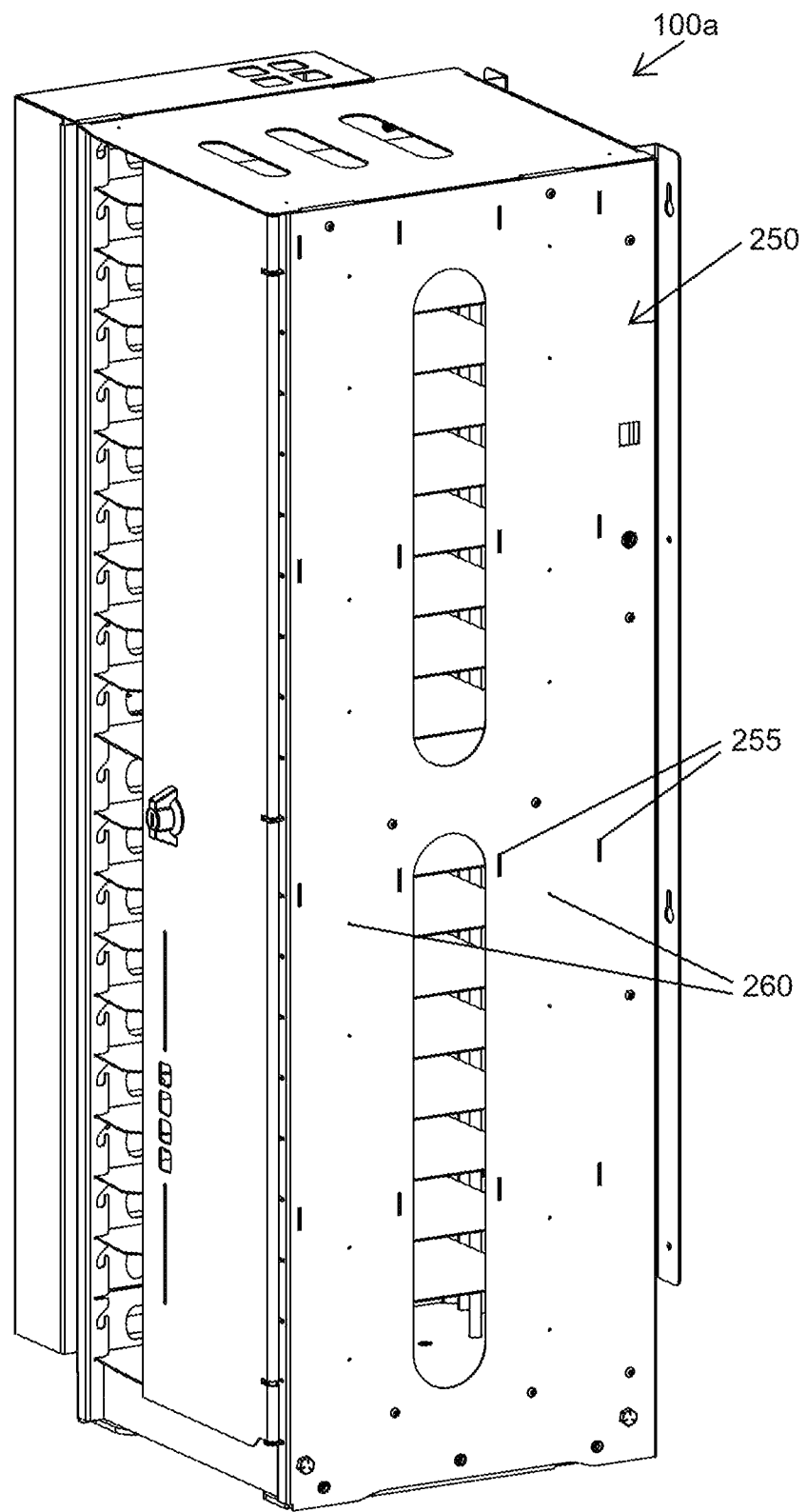
FIGS. 18 and 19 depict the example storage and charging system of FIG. 11 including various accessories that may be attached to the tower assembly.
Figure 19:
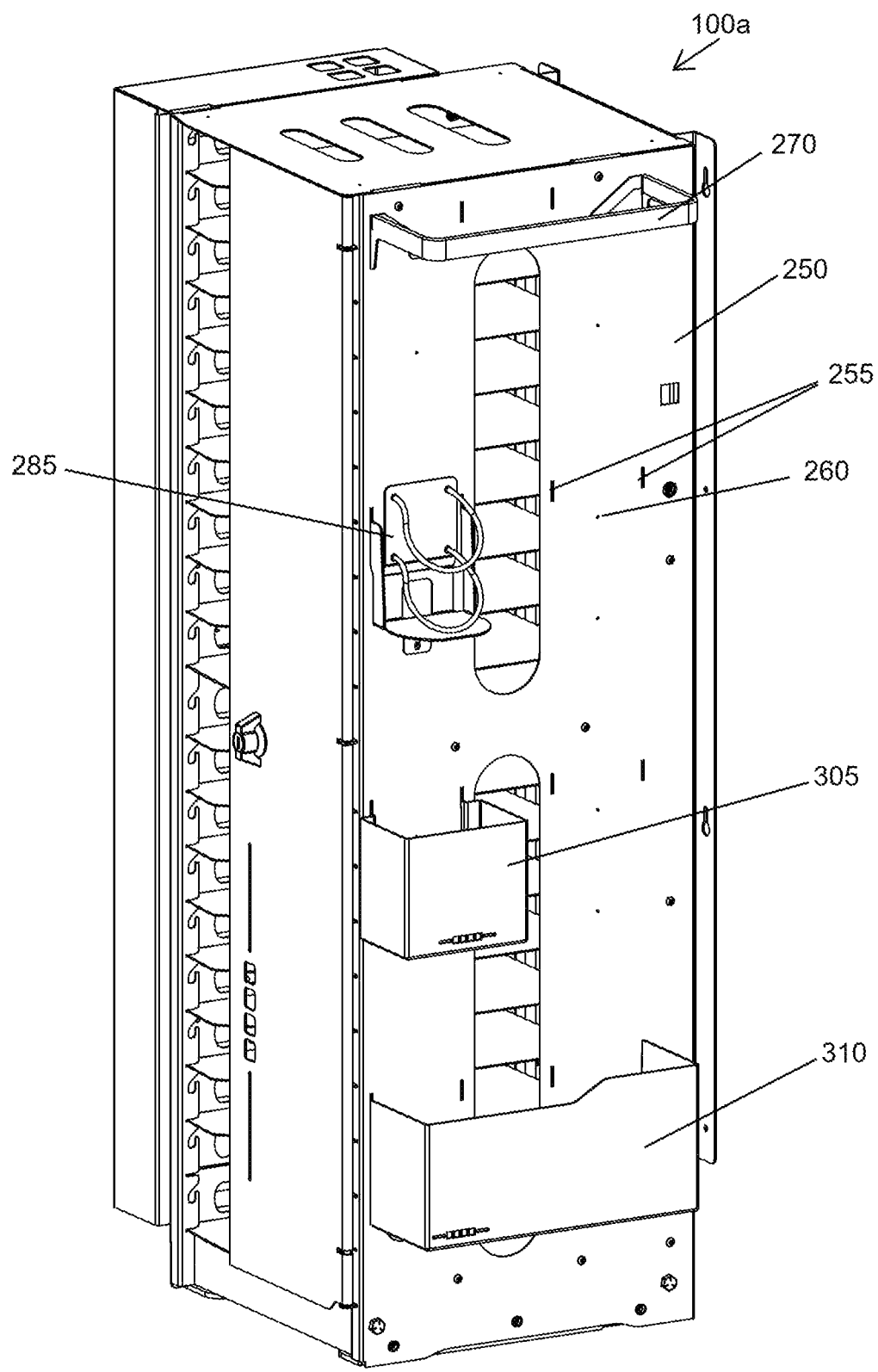

FIGS. 18 and 19 depict the example storage and charging system of FIG. 11 including a grid system 250 to which various accessories that may be attached to the tower assembly 100*a*. The example grid system 250 includes various slots 255 and openings 260 for additional fasteners positioned at regular intervals along a side panel of the example tower assembly 100*a*. As shown in FIG. 19, one or more accessories are coupled to the tower assembly using the slots 225. Some of the accessories are wider (e.g., use slots that are spaced further apart) and some of the accessories are narrower (e.g., use slots that are adjacent to one another). The accessories are attached to the tower assembly 100*a* using hook-like features 265 that correspond with the slots 255 to hold the accessories in place on the tower assembly 100*a*. In some examples, the accessories may be attached to the tower assembly 100a using additional fasteners (e.g., screws) and the corresponding openings 260 for additional fasteners.

Figure 20:
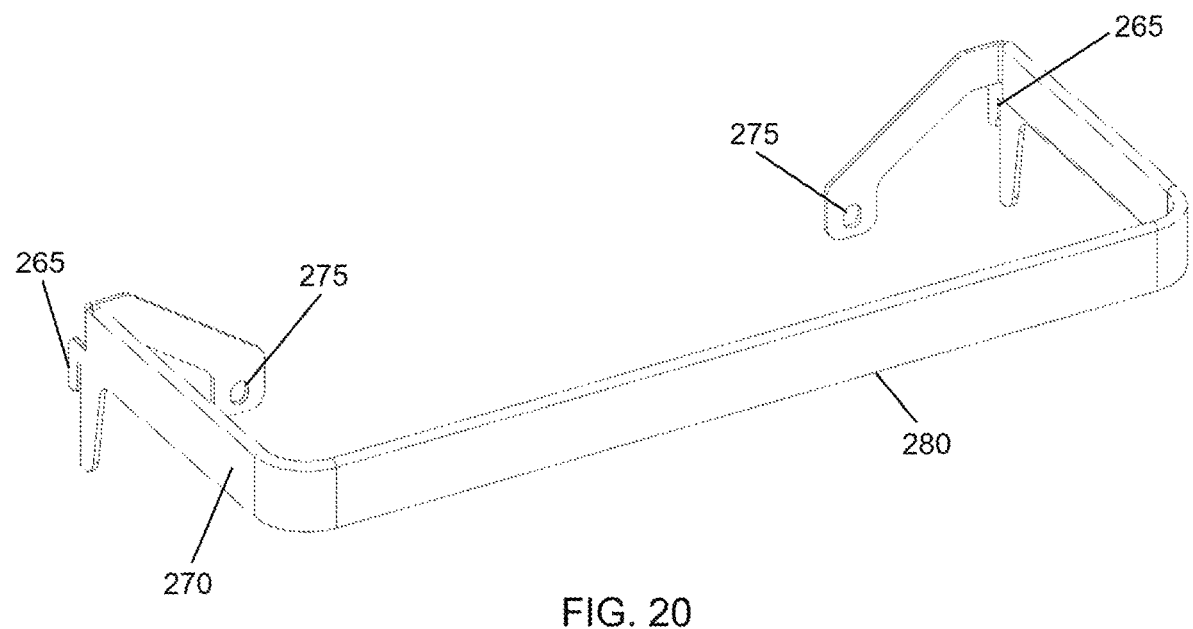
FIGS. 20-23 depict more detailed views of the example accessories shown in FIG. 18.

FIGS. 20-23 depict more detailed views of the example accessories shown in FIGS. 18 and 19. FIG. 20 depicts an example headphone holder 270 that may be attached to the tower assembly 100a. The example headphone holder 270 is attached using two slots 255 that are spaced apart and two hook-like features 265 on the headphone holder 270. Additionally, the headphone holder 270 is attached using two screws positioned through openings 275 of the headphone holder 270 and corresponding openings 260 of the grid system 250 on the tower assembly 100a. The headphone holder 270 includes a thin bar 280 over which headphones (e.g., over-ear headphones with a connecting bridge) may be hung. While the headphone holder 270 is primarily used for storage, it may also be possible to charge the headphones (e.g., wireless headphones, Bluetooth headphones) when the headphones are positioned on the headphone holder 270 using a cord connected to a power supply of the tower assembly 100a.

Figure 21:
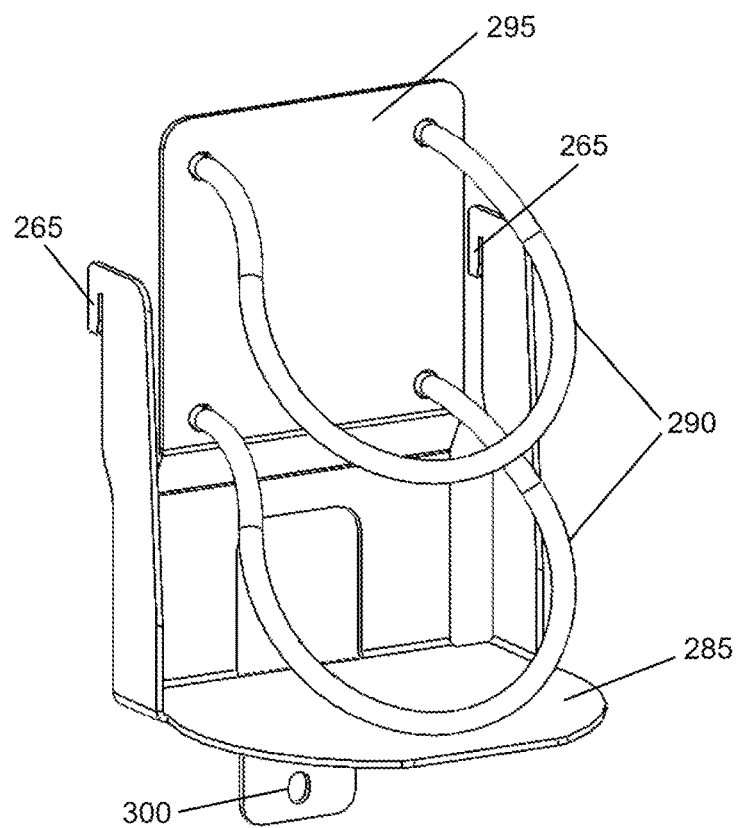

FIG. 21 depicts an example shelf 285 including elastic cords 290 attached to a back plate 295 connected to the shelf 285. The example shelf 285 is also attached to the tower assembly 100a using two hooks 265 positioned in corresponding slots 255 and a screw positioned through an opening 300 below the shelf 285 and a corresponding opening 260 on the grid system 250 of the tower assembly 100a. The shelf 285 with the elastic cords 290 may be used with a spray bottle which may include a cleaning solution, a container of cleaning wipes, or any other container that fits on the shelf 285.

Figure 22:
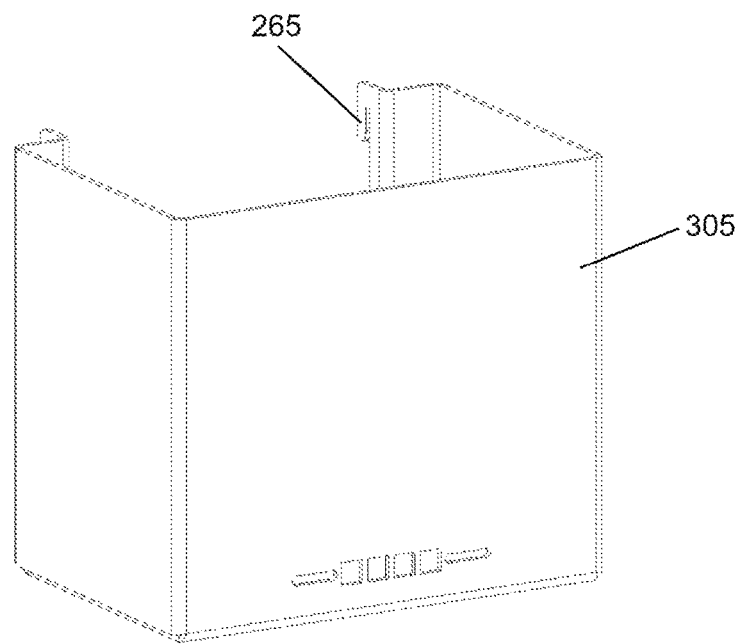
Figure 23:
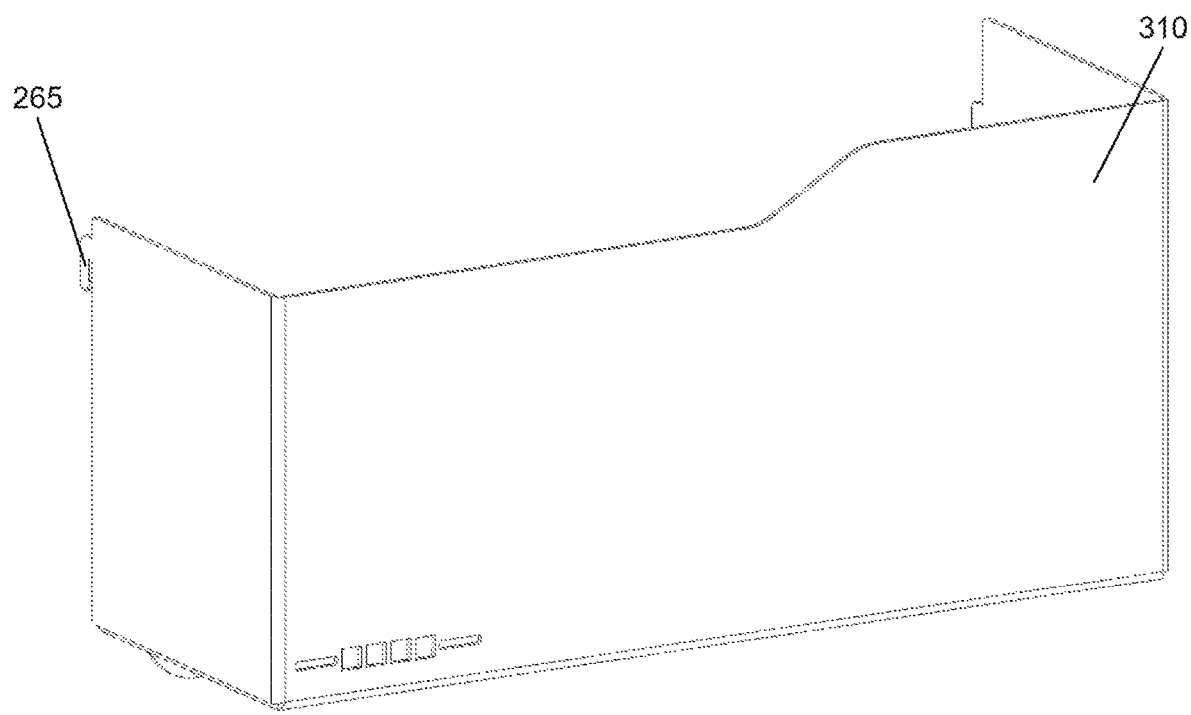

FIGS. 22 and 23 depict corresponding small and large baskets 305, 310. The small basket 305 may be attached to the tower assembly 100a using the narrow arrangement and the large basket 310 may be attached using a wide arrangement. Both the small basket 305 and the large basket 310 include two hooks 265 that attach to corresponding slots 255 in the grid system 250. Additionally, each basket 305, 310 includes one or more additional fasteners (e.g., screws) positioned through corresponding openings below the basket 305, 310 and a corresponding opening 260 on the grid system 250 of the tower assembly 100a. The baskets 305, 310 may be used for any items that may fit within the baskets 305, 310, including writing utensils, cleaning supplies, clipboards, etc.

Figure 24:
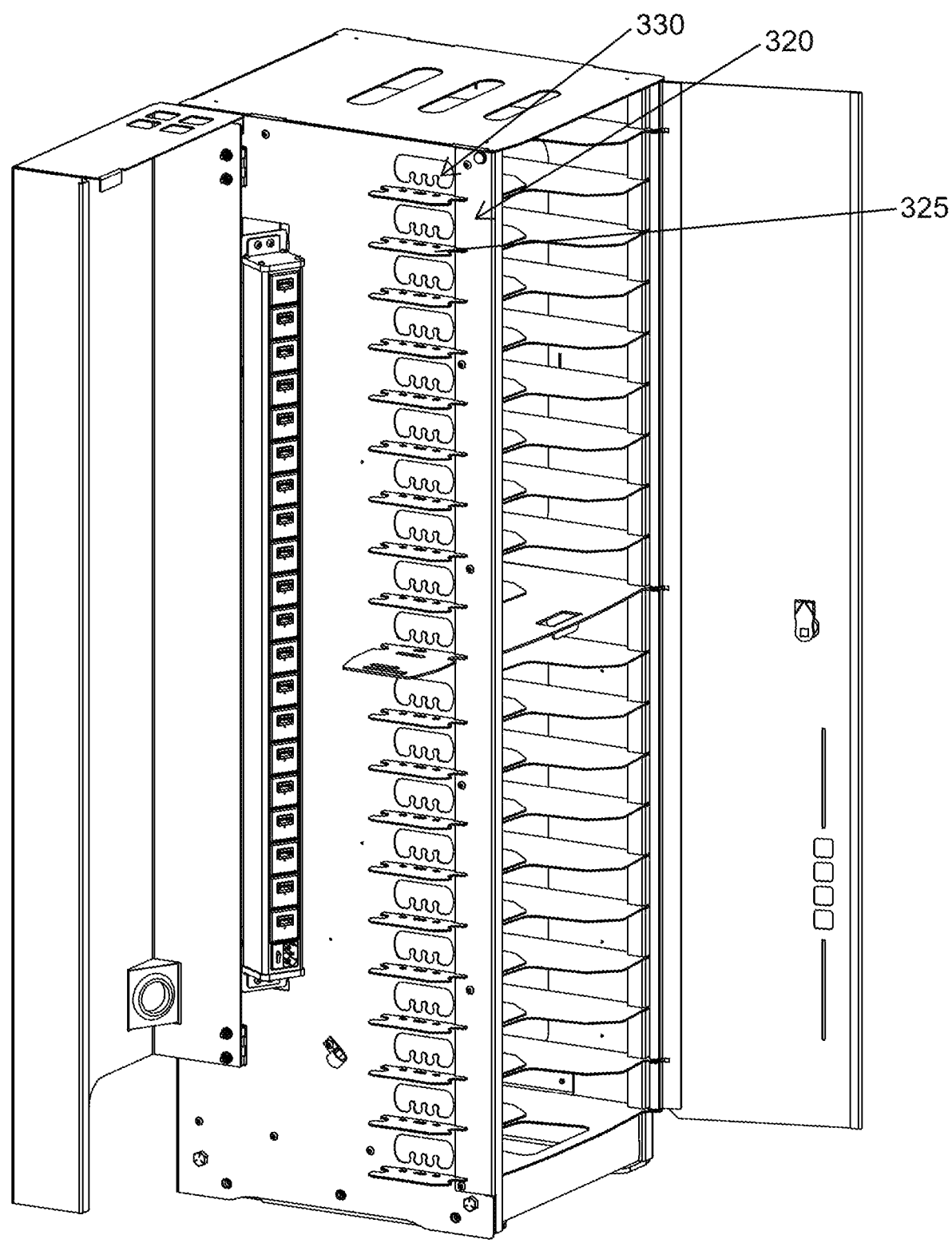
Figure 25:
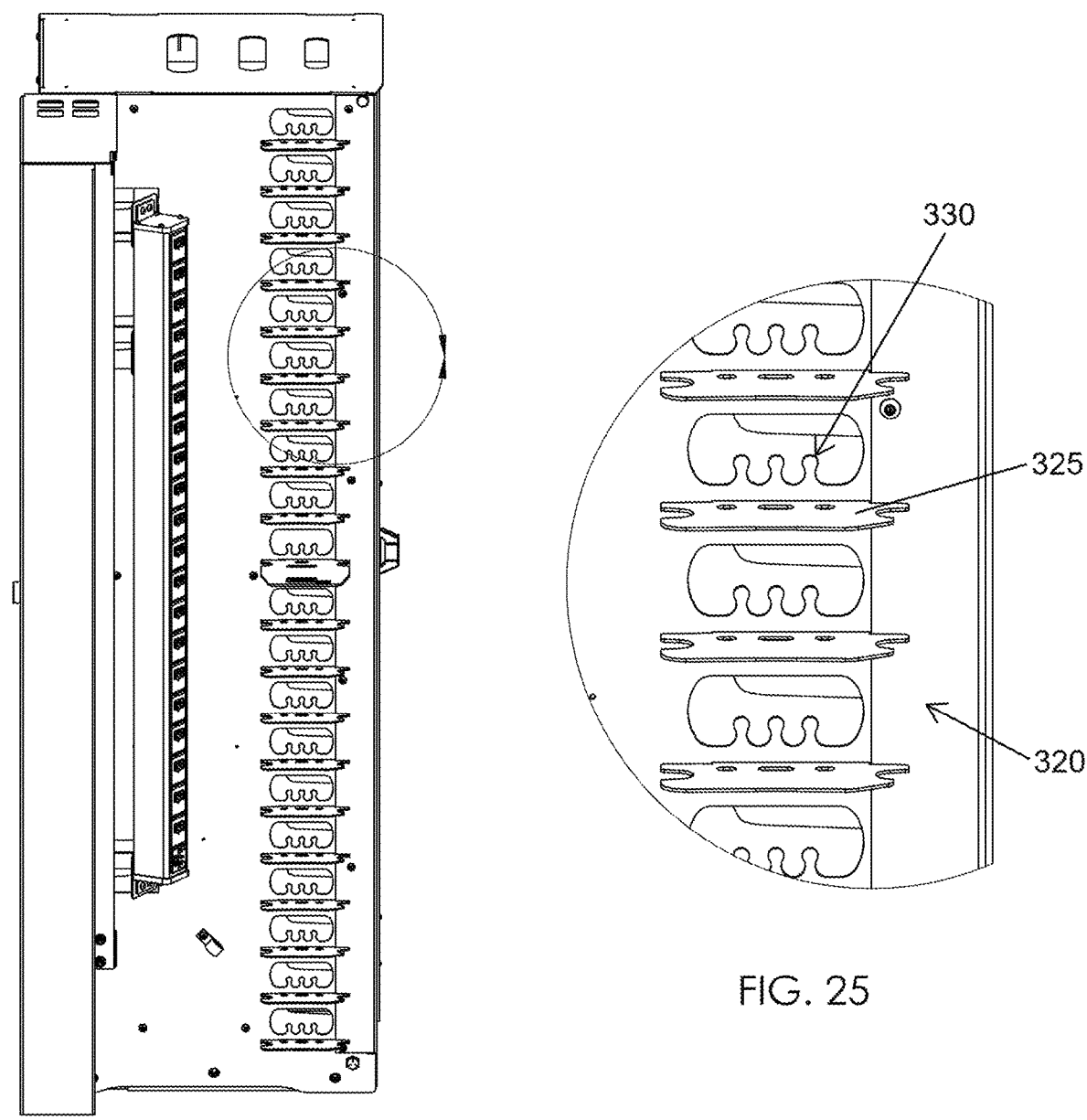

FIGS. 24-26 depict example wire management system 320 that may be included in the example tower assembly 100a depicted in FIG. 11 to store wires for each of the devices. FIG. 24 depicts a side perspective view of the example wire management system 320 with example shelf portions 133 and charging cables wrapped around the shelf portions 133. FIG. 25 depicts a side view of a portion of the wire management systems 320, and FIG. 26 depicts an opposite side perspective view of the wire management system 320 (e.g., from the shelf side). The cable is then threaded through the toothed portion 330 to hold the cable in place. An end of the cable that plugs into the device is positioned on the shelf side of the wire management system 320. The end of the cable may be positioned within another slot 335 to further hold the end in place. The wire management system 320 keeps the cables from tangling and enables a user to easily determine which charging cable is connected to which device. Additionally, the wire management system 320 holds the end of each cable in place for easy access for device charging.

Figure 27:
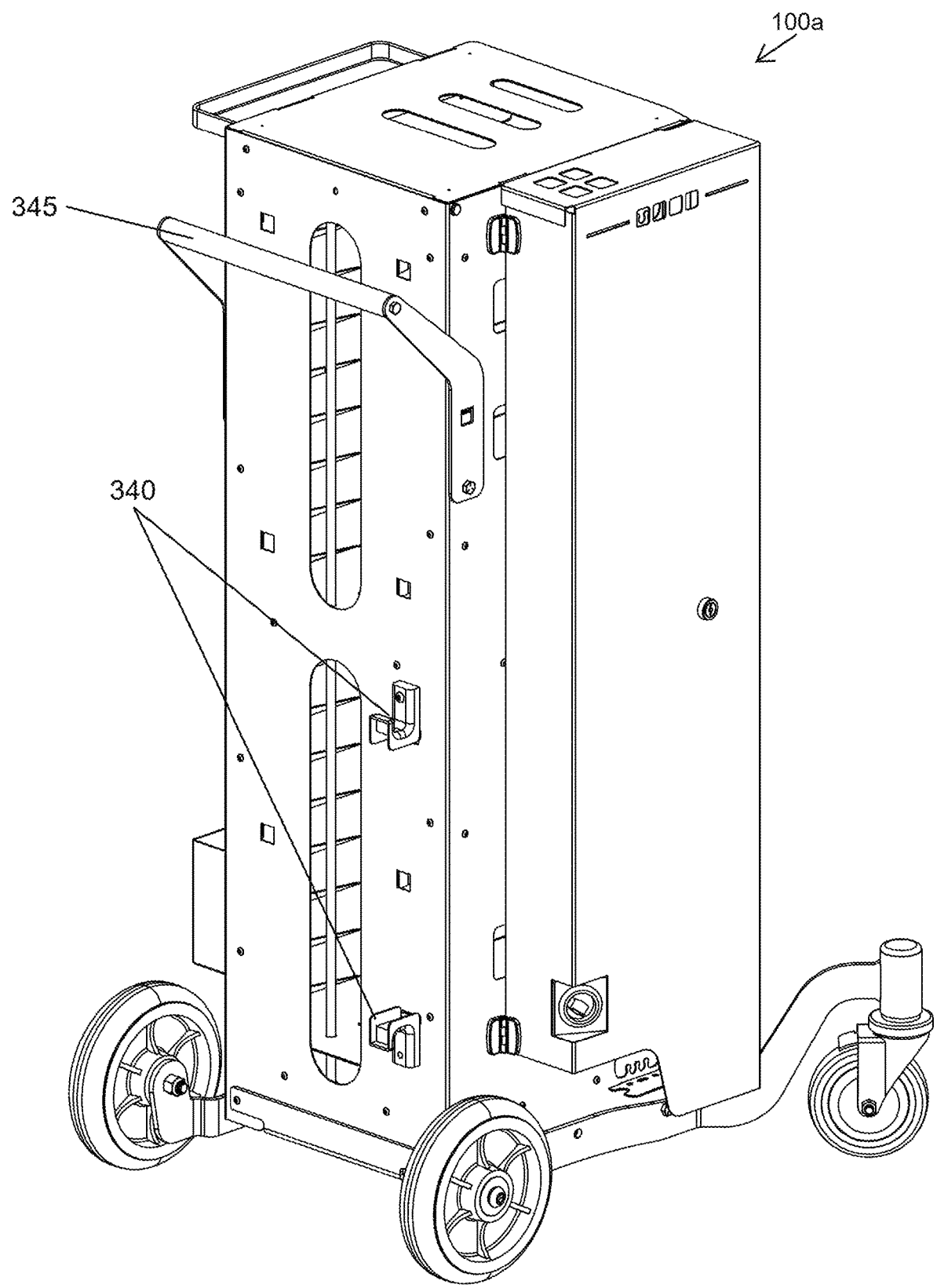
FIGS. 27 and 28 depicts example cable management hooks that may be included on the example storage and charging station system of FIGS. 12 and 13 with different support features.
Figure 28:
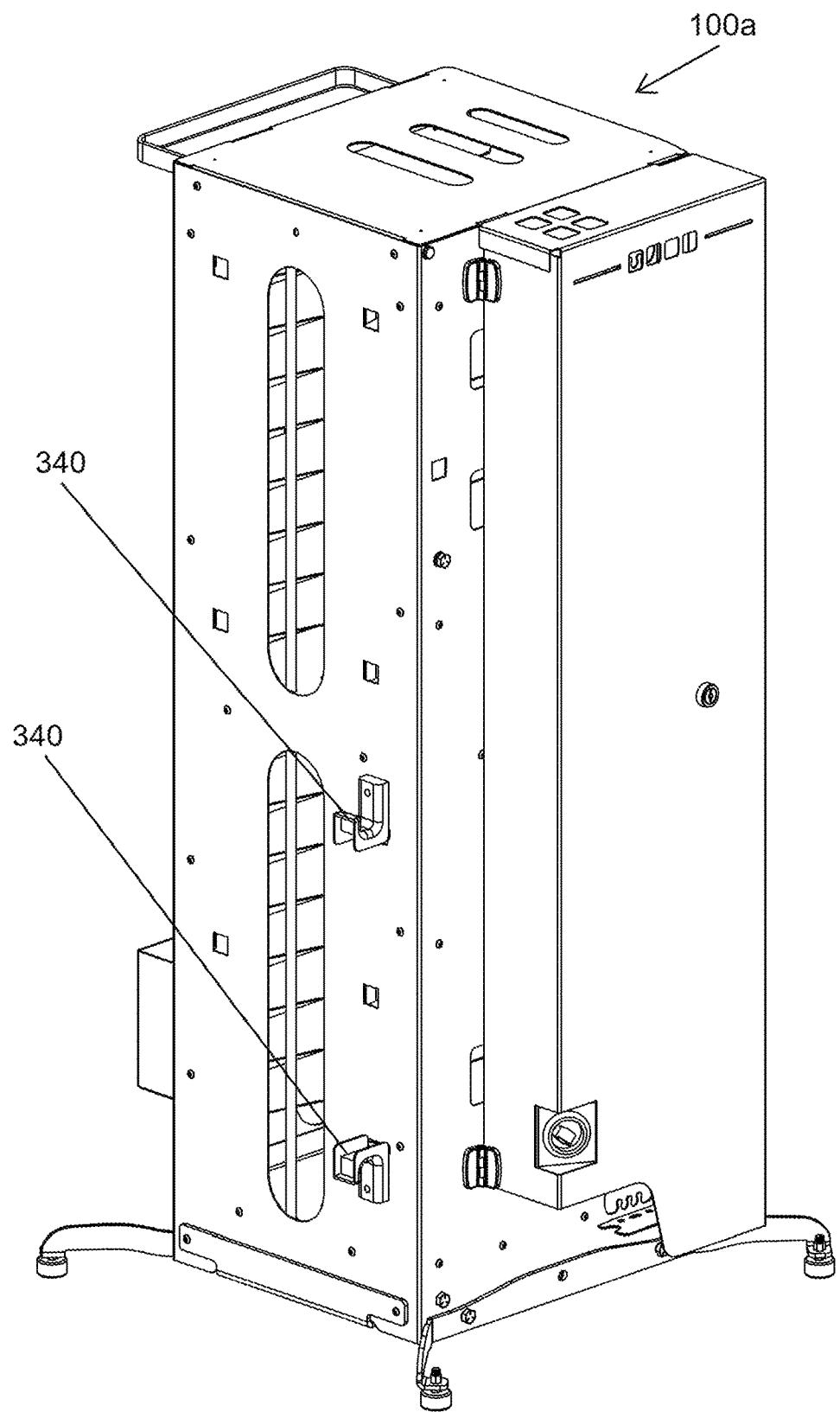

FIGS. 27 and 28 depicts example cable management hooks 340 that may be included on the example tower assemblies 100a with different support features. FIG. 27 depicts a set of cable management hooks 340 that is attached to a back surface of the tower assembly depicted in FIG. 13, which includes a wheeled base. In this example construction, the cable management hooks 340 may be used to store a power cable for the tower assembly 100 when the tower assembly 100a is being moved or is not in use. This particular construction may also include a handle 345 that can be used to wheel the tower assembly 100a from room to room. FIG. 28 depicts a set of cable management hooks 340 that is attached to a back surface of the tower assembly 100a depicted in FIG. 12. As discussed above, the power cable for the tower assembly 100a may be wrapped around the hooks 340 to store the power cable when not in use.

Figure 29:
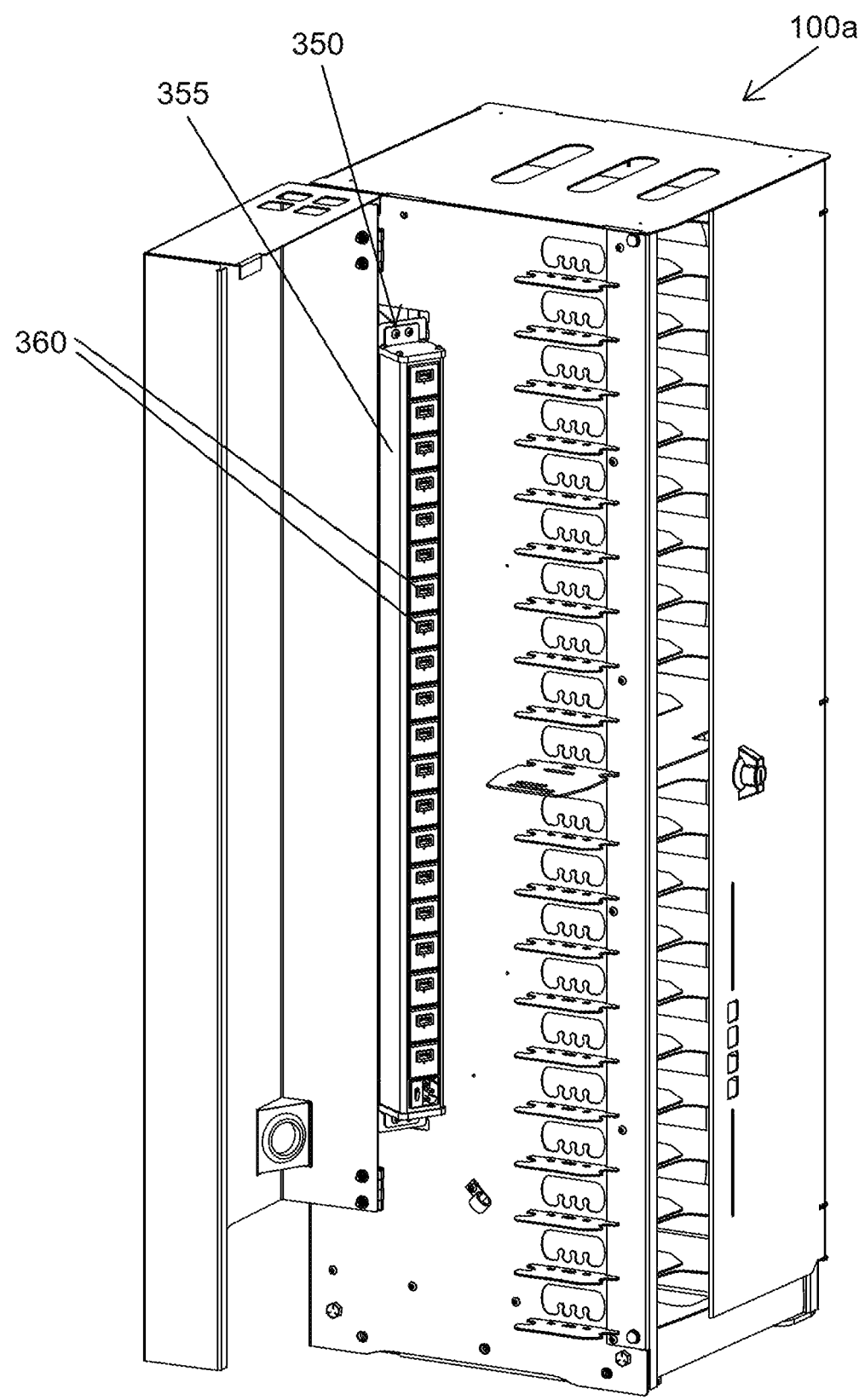
FIGS. 29-31 depict example power distribution units that may be used with the example storage and charging system of FIG. 11.
Figure 30:
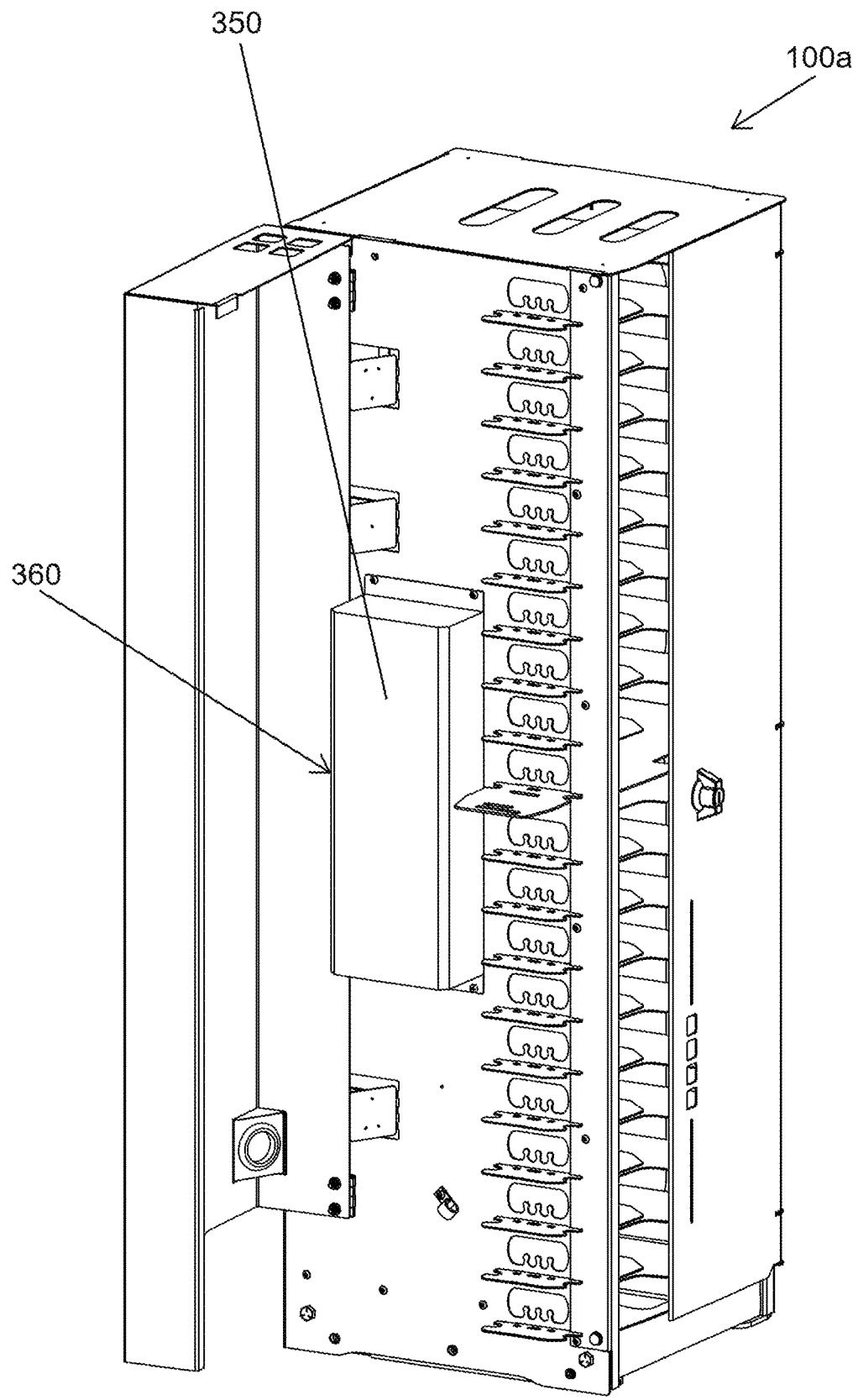
Figure 31:
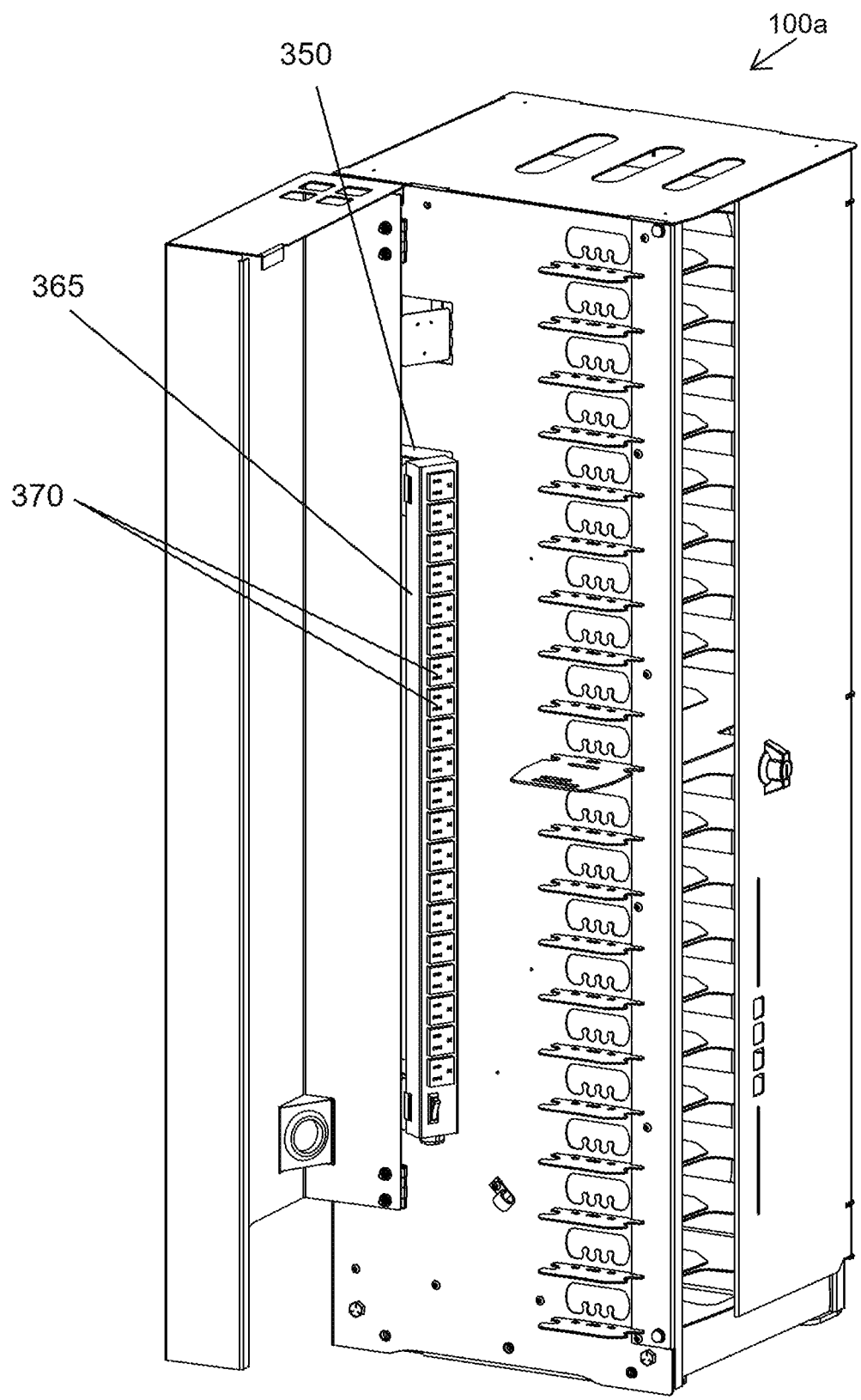

FIGS. 29-31 depict example power distribution units 350 that may be used with the example storage and charging system of FIG. 11 or any similar storage and charging system. FIG. 29 depicts a power distribution unit 350 that includes a power strip 355 having USB outlets 360 for charging small devices. FIG. 30 depicts a power distribution unit 350 that also contains USB outlets 360 for charging small devices. FIG. 31 depicts a power distribution unit 350 that includes a power strip 365 having typical wall outlets 370. The power distribution units 350 depicted in FIGS. 29-31 are connected to a wall socket.

The example features and improvements described in conjunction with tower assembly 100a of FIGS. 11-31 may be used with any similar tower assemblies, including but not limited to the tower assembly 100 of FIGS. 1-10. All of the metal components of the disclosed tower assemblies are preferably powder coated for protection, improved appearance and ease of sanitary cleaning. Powder coating can be done in almost any color or colors, and can be shiny or opaque. Accordingly, the tower assembly 100a can be provided to educational buyers in school colors, and to commercial companies in colors to match or complement company logos, marketing themes, work environment or buyer preference.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. As multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

What is claimed is:

1. A storage and charging station system for mobile electronic devices comprising:
    a support tower structure having an inner volume including a first plurality of shelves for storing the mobile electronic devices during charging;
    a support device coupled to the support tower structure;
    a grid system on a side of the support tower structure, the grid system configured for receiving various accessories;
    a wire management system positioned adjacent to each shelf of the first plurality of shelves;
    a cable management system coupled to a side of the support tower structure exterior to the inner volume, the cable management system comprising a second plurality of shelves for supporting portions of power sources to power the mobile electronic devices; and
    a power distribution unit coupled to the support tower structure, the power distribution unit including a plurality of outlets for the cable management system.

2. The storage and charging station system of claim 1, wherein the support device includes a plurality of support legs coupled to a bottom of the support tower structure.

3. The storage and charging station system of claim 1, wherein the support device includes a wheeled base coupled to a bottom of the support tower structure.

4. The storage and charging station system of claim 3, wherein the wheeled base includes wheels on casters.

5. The storage and charging station system of claim 1, wherein the support device includes a bracket coupled to a back of the support tower structure, wherein the bracket enables the support tower structure to be mounted to a wall.

6. The storage and charging station system of claim 1, wherein the grid system includes respective slots, and wherein the various accessories include a headphone holder, the headphone holder comprising:
    a bar having a first end and a second end opposite the first end; and
    a hook feature provided on each of the first and second ends, the hook feature configured to couple the headphone holder to the respective slots of the grid system.

7. The storage and charging station system of claim 1, wherein the grid system includes respective slots, and wherein the various accessories include a shelf, the shelf comprising:
    a back plate having elastic cords disposed on a first side of the back plate such that the elastic cords are provided in a region above the shelf; and
    a hook feature provided on a second side of the back plate, the hook feature configured to couple the shelf to the respective slots of the grid system.

8. The storage and charging station system of claim 1, wherein the grid system includes respective slots, and wherein the various accessories include a basket, the basket comprising:
    a bottom surface;
    a front surface;
    a first side surface and a second side surface opposite the first side surface; and
    a hook feature provided on each of the first side surface and the second side surface, the hook feature configured to couple the basket to the respective slots of the grid system such that the grid system forms a back surface of the basket.

9. The storage and charging station system of claim 1, wherein the wire management system includes a toothed portion to hold a cable in place, and wherein the toothed portion includes three projections.

10. The storage and charging station system of claim 1, wherein the wire management system includes a slot to hold an end of a cable.

11. The storage and charging station system of claim 1, wherein the cable management system includes two hooks around which a cable is wrapped.

12. The storage and charging station system of claim 1, further comprising a handle coupled to a side of the support tower structure.

13. The storage and charging station system of claim 1, wherein each shelf of the first plurality of shelves and each shelf of the second plurality of shelves are integral with one another, respectively.

14. The storage and charging station system, of claim 1, further comprising a spatial limiting device provided through a surface of the support tower structure, the spatial limiting system configured to adjust a usable area of the shelves.

15. The storage and charging station system of claim 14, wherein the spatial limiting device can be configured to adjust the usable area of the shelves to a first depth and a second depth relative to a back of the support tower structure, the first depth being greater than the second depth.

16. The storage and charging station system of claim 15, wherein the spatial limiting device further comprises:
   a first and second pair of openings provided on a bottom of the support tower structure; and
   a pair of rods to be inserted into one of the first or second pair of openings;
wherein inserting the pair of rods into the first pair of openings limits the usable area of the shelves to the first depth, and inserting the pair of rods into the second pair of openings limits the usable area of the shelves to the second depth.

17. The storage and charging station system of claim 1, wherein the power distribution unit is provided on an angled mounting flange.

18. The storage and charging station system of claim 1, wherein each power source includes a charging block and each shelf of the plurality of shelves is configured to support a charging block.

19. A storage and charging station system for mobile electronic devices comprising:
   a frame having a plurality of sides;
   a first security door coupled to one of the plurality of sides, the first security door to provide a secure closure for a storage portion of the storage and charging station system; and
   a second security door coupled to one of the plurality of sides, the second security door to provide a secure closure for a charging portion of the storage and charging station system,
   wherein each of the first and second security doors, respectively, includes a lockable latch.

20. The storage and charging station system of claim 19, further including a hinge to couple each of the first and second security doors, respectively, to the one of the plurality of sides.

21. The storage and charging station system of claim 20, wherein the hinge includes tubular hinge housing having an array of parallel cut ring slots and the frame includes a plurality of rod retaining rings, the array of parallel cut rings and the plurality of rod retaining rings forming a hinge channel.

22. The storage and charging station system of claim 21, further comprising a cylindrical hinge rod, the cylindrical hinge rod to be slid into the hinge channel to couple the first security door to the frame.

* * * * *